United States Patent
Liu et al.

(10) Patent No.: US 11,067,710 B2
(45) Date of Patent: Jul. 20, 2021

(54) SYSTEM AND METHOD FOR INDIRECTLY MONITORING ONE OR MORE ENVIRONMENTAL CONDITIONS

(71) Applicant: Atomic Energy Of Canada Limited / Energie Atomique, Chalk River (CA)

(72) Inventors: Yu Liu, Petawawa (CA); Liqian Li, Deep River (CA); Karen Dawn Collins, Deep River (CA); Michael Nishimura, Deep River (CA)

(73) Assignee: Atomic Energy Of Canada Limited / Energie Atomique Du Canada Limitee, Chalk River (CA)

( * ) Notice: Subject to any disclaimer, the term of this patent is extended or adjusted under 35 U.S.C. 154(b) by 162 days.

(21) Appl. No.: 16/345,494

(22) PCT Filed: Oct. 31, 2017

(86) PCT No.: PCT/CA2017/051289
§ 371 (c)(1),
(2) Date: Apr. 26, 2019

(87) PCT Pub. No.: WO2018/076121
PCT Pub. Date: May 3, 2018

(65) Prior Publication Data
US 2019/0369273 A1 Dec. 5, 2019

Related U.S. Application Data

(60) Provisional application No. 62/414,885, filed on Oct. 31, 2016.

(51) Int. Cl.
*G01T 1/36* (2006.01)
*G01T 1/02* (2006.01)
(Continued)

(52) U.S. Cl.
CPC ............... *G01T 1/365* (2013.01); *G01T 1/02* (2013.01); *G01T 7/02* (2013.01); *H04W 24/10* (2013.01); *H04W 84/18* (2013.01)

(58) Field of Classification Search
None
See application file for complete search history.

(56) References Cited

U.S. PATENT DOCUMENTS 4,053,772 A    10/1977  Felice
5,596,199 A *  1/1997   McNulty ................. G01T 1/026
                                                          250/370.06
(Continued)

FOREIGN PATENT DOCUMENTS

WO        2014056976        4/2014

OTHER PUBLICATIONS

Communication pursuant to Rule 164(10 EPC on EP 17864851.5 dated May 7, 2020.
IPRP on PCT/CA2017/051289 Apr. 30, 2019.

*Primary Examiner* — Edwin C Gunberg
(74) *Attorney, Agent, or Firm* — Kevin Shipley; Fogler, Rubinoff LLP

(57) ABSTRACT

A system for monitoring ionizing radiation in a target area, the system may include a first plurality of consumable nodes deployable within the target area to be exposed to the ionizing radiation. Each consumable node may be progressively damageable over a monitoring time as a result of exposure to the ionizing radiation. A base station may be operable to detect an amount of radiation damage sustained by the consumable nodes and to determine a dosage of ionizing radiation received by any one of the consumable nodes based on a pre-determined correlation between the dosage of ionizing radiation and the amount of radiation damage sustained by the consumable node.

19 Claims, 33 Drawing Sheets

(51) Int. Cl.
*G01T 7/02* (2006.01)
*H04W 24/10* (2009.01)
*H04W 84/18* (2009.01)

(56) References Cited

U.S. PATENT DOCUMENTS

| | | |
|---|---|---|
| 8,798,084 B2 | 8/2014 | Pratt, Jr. et al. |
| 8,822,924 B2 | 9/2014 | Valentino et al. |
| 2003/0152041 A1* | 8/2003 | Herrmann ............... H04Q 9/00 370/310 |
| 2015/0237419 A1 | 8/2015 | Lee |
| 2017/0038425 A1 | 2/2017 | Wittkop |

\* cited by examiner

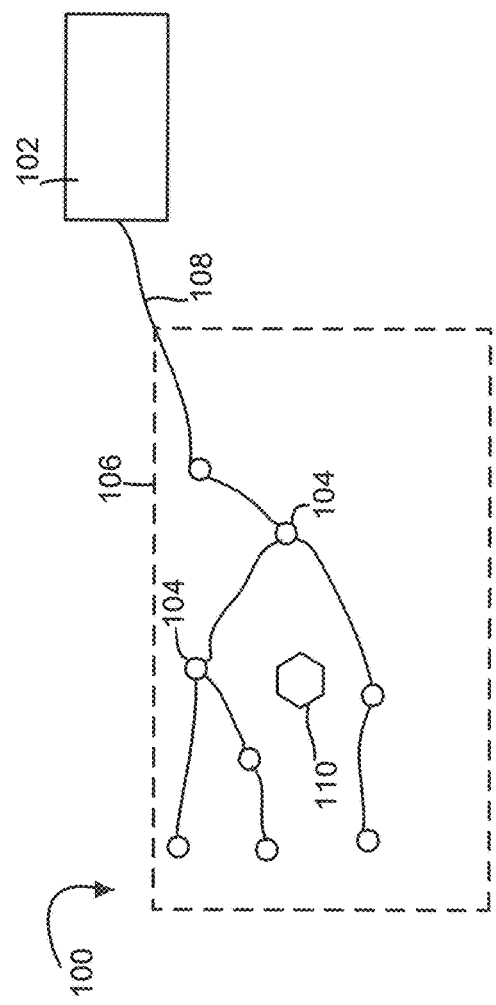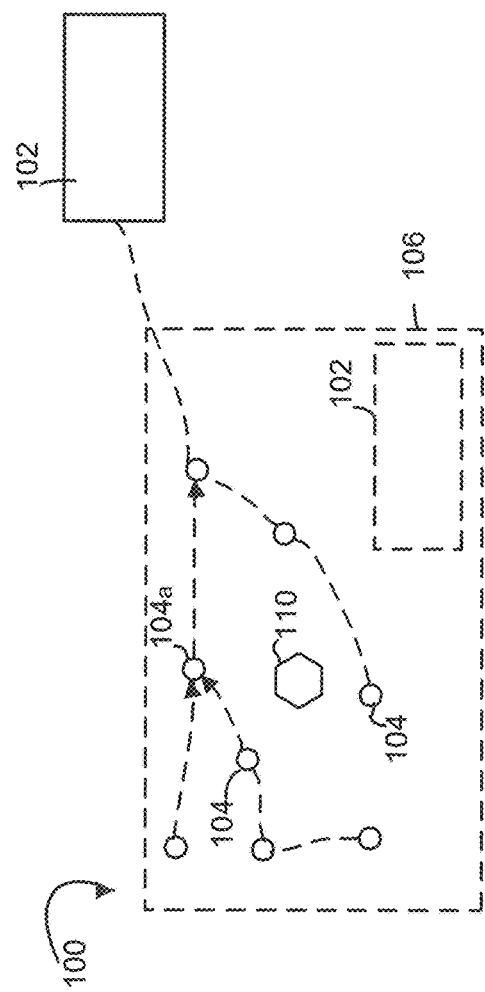
FIG. 1
FIG. 2

SYSTEM AND METHOD FOR INDIRECTLY MONITORING ONE OR MORE ENVIRONMENTAL CONDITIONS

CROSS REFERENCE TO RELATED APPLICATIONS

This application claims the benefit U.S. Provisional Application No. 62/414,885 filed Oct. 31, 2016 and entitled System And Method For Indirectly Monitoring One Or More Environmental Conditions, the entirety of which is incorporated herein by reference.

FIELD

The present teachings described herein relate generally to systems and to indirectly monitor one or more environmental conditions/parameters and methods of using such systems. The teachings enclosed herein also relate generally a communication protocol for a wireless sensor network to be used in systems to indirectly monitor one or more environmental conditions/parameters.

BACKGROUND

U.S. Pat. No. 8,886,229 describes techniques for using wireless devices to implement sensor networks. For cognitive radio, a wireless device obtains measurements for a first system (e.g., a broadcast system) with which the wireless device is not in communication. The wireless device sends the measurements and associated location information and/or timestamps via a second system (e.g., a cellular system). A server receives measurements from a number of wireless devices and determines the coverage of the first system based on the measurements. For other applications, a wireless device obtains sensor information from at least one sensor at the wireless device and sends the sensor information and associated location information and/or timestamps via a wireless system. A server receives the sensor information and associated information from a number of wireless devices, aggregates the sensor information, and constructs a map. The wireless device may develop a user profile based on the sensor information and associated information.

U.S. Pat. No. 8,822,924 describes a radiation dosimeter including multiple sensor devices (including one or more passive integrating electronic radiation sensor, a MEMS accelerometers, a wireless transmitters and, optionally, a GPS, a thermistor, or other chemical, biological or EMF sensors) and a computer program for the simultaneous detection and wireless transmission of ionizing radiation, motion and global position for use in occupational and environmental dosimetry. The described dosimeter utilizes new processes and algorithms to create a self-contained, passive, integrating dosimeter. Furthermore, disclosed embodiments provide the use of MEMS and nanotechnology manufacturing techniques to encapsulate individual ionizing radiation sensor elements within a radiation attenuating material that provides a "filtration bubble" around the sensor element, the use of multiple attenuating materials (filters) around multiple sensor elements, and the use of a software algorithm to discriminate between different types of ionizing radiation and different radiation energy.

SUMMARY

This summary is intended to introduce the reader to the more detailed description that follows and not to limit or define any claimed or as yet unclaimed invention. One or more inventions may reside in any combination or subcombination of the elements or process steps disclosed in any part of this document including its claims and figures.

In accordance with one broad aspect of the teachings disclosed herein, a system for monitoring ionizing radiation in a target area may include a first plurality of consumable nodes deployable within the target area to be exposed to the ionizing radiation. Each consumable node may be progressively damageable over a monitoring time as a result of exposure to the ionizing radiation. A plurality of resilient nodes may be deployable within the target area amongst the consumable nodes to be exposed to the ionizing radiation. Each resilient node may be progressively damageable over the monitoring time as a result of exposure to the ionizing radiation at a slower rate than the consumable nodes. A base station may be communicably linked to the consumable nodes and may be operable to detect an amount of radiation damage sustained by the consumable nodes and to determine a dosage of ionizing radiation received by any one of the consumable nodes based on a pre-determined correlation between the dosage of ionizing radiation and the amount of radiation damage sustained by the consumable node. The first plurality of consumable nodes and the plurality of resilient nodes may be communicably linked in a plurality of clusters. Each cluster may include at least one resilient node communicably linked to the base station and at least one consumable node indirectly linked to the base station via the one of the resilient nodes.

In accordance with another broad aspect of the teachings disclosed herein, a system for monitoring ionizing radiation in a target area may include a first plurality of consumable nodes deployable within the target area to be exposed to the ionizing radiation. Each consumable node may be progressively damageable over a monitoring time as a result of exposure to the ionizing radiation. A base station may be communicably linked to the consumable nodes and may be operable to detect an amount of radiation damage sustained by the consumable nodes and to determine a dosage of ionizing radiation received by any one of the consumable nodes based on a pre-determined correlation between the dosage of ionizing radiation and the amount of radiation damage sustained by the consumable node.

The base station may be positionable outside the target area.

Each consumable node may have at least one property that undergoes error events as a result of exposure to the ionizing radiation and wherein the base station detects the amount of radiation damage sustained by the consumable nodes by detecting the error events of each consumable node over time while the consumable nodes are exposed to the ionizing radiation. The base station may be operable to determine a dosage of ionizing radiation received by any one of the consumable nodes based on a pre-determined correlation between the dosage of ionizing radiation and the number of detected error events for the one consumable node.

Each consumable node may include at least one consumable electronics module that is damageable by the ionizing radiation. The property may include a state stored in a memory module of the electronics module and the error event may be an unprogrammed change of the state stored in the memory module.

The electronics module may include at least one microcontroller in the form of a semiconductor digital integrated circuit that includes the memory module.

The memory module may have at least one electrically readable programmable rear-only memory (EEPROM).

The memory module may have at least one cluster of at least three EEPROMs.

Each consumable node may have an onboard power supply and a transceiver to wirelessly communicate with the base station and at least one electronics module having a processor and a memory module that is damageable by the ionizing radiation.

Each consumable node may have two or more electronics modules.

Each consumable node may communicate directly with the base station.

At least some of the plurality of consumable nodes may indirectly communicate with the base station via at least one other one of the plurality of consumable nodes.

A plurality of resilient nodes may be positionable within the target area amongst the plurality of consumable nodes and may be communicably linked to the base station. The resilient nodes may be configured to remain functional for a longer time than the consumable nodes when exposed to the ionizing radiation.

The resilient nodes may include radiation shielding.

Each resilient node may include a transceiver, a power supply and a first electronics module disposed within the radiation shielding to be at least partially shielded from the ionizing radiation, and at least one sacrificial electronics module disposed outside the radiation shielding to be exposed to the ionizing radiation, whereby the first electronics module survives longer than the at least one sacrificial electronics module when the resilient node is exposed to the ionizing radiation.

At least a portion of the plurality of the resilient nodes may be communicably linked with each other to form a communication backbone in communication with the base station. The consumable nodes may be indirectly communicably linked to the base station by the communication backbone.

The plurality of consumable nodes and resilient nodes may be communicably linked in a plurality of clusters. Each cluster may include at least one resilient node communicably linked to the base station and at least one consumable node communicably linked to the at least one resilient node and are therefore indirectly linked to the base station via the one of the resilient nodes.

The plurality of consumable nodes may be randomly deployable within the target area and the plurality of resilient nodes may be deployed within the target area in a pre-determined pattern.

The plurality of consumable nodes and the plurality of resilient nodes may be randomly deployable within the target area.

When exposed to a first dosage of ionizing radiation the consumable nodes may have a lifespan of L after which they are rendered inoperable, and the resilient nodes may have a lifespan of at least 2 L.

The number of resilient nodes may be less than about 50% or about 25% or about 12.5% of the sum of the number of resilient nodes and the consumable nodes.

The first plurality of consumable nodes may be deployed in the target area at a first time. A second plurality of consumable nodes may be deployed in the target area at a later, second time.

The second set of consumable nodes may be deployed in the target area after at least a portion of the first set of consumable nodes have been rendered inoperable due to exposure to the ionizing radiation.

The consumable nodes may be pre-irradiated to a pre-determined threshold radiation dosage prior to being deployed in the target area.

The threshold dosage may be between about 150 Gy and about 250 Gy.

The ionizing radiation may be gamma radiation

The consumable nodes may be essentially free from radiation shielding.

A plurality of radiation-resistant nodes may be deployed amongst the consumable nodes and the resilient nodes within the target area, and may be communicably linked to the base station and at least some of the consumable nodes and resilient nodes.

In accordance with another broad aspect of the teachings described herein, a method of monitoring ionizing radiation within a target area can include the steps of:

a) distributing a first plurality of consumable nodes within the target area and exposing the consumable nodes to the ionizing radiation, wherein the consumable nodes are damaged by the ionizing radiation over time;

b) determining an amount of radiation damage sustained by at least a portion of the consumable nodes as a result of exposure to the ionizing radiation using a base station; and c) determining a dosage of the ionizing radiation received by the at least a portion of the consumable nodes using the base station based on a pre-determined correlation between ionizing radiation dosage and the amount of radiation damage sustained by the consumable nodes.

The method may include the step of pre-irradiating the consumable nodes prior to positioning the consumable nodes in the target area.

The step of pre-irradiating may include subjecting the consumable nodes to a threshold dosage of the ionizing radiation.

The threshold dosage may be between 150 Gy and 250 Gy.

Each consumable nodes may have at least one electronics module that is progressively damaged by exposure to the ionizing radiation Step c) may include measuring the accumulation of radiation-damage-induced error events of the at least one electronics module and determining a dosage of ionizing radiation received based on a pre-determined correlation between ionizing radiation dosage and the number of detected error events.

The method may also include the steps of:

a) deploying a plurality of resilient nodes within the target area, the resilient nodes wherein the consumable nodes are damaged by the ionizing radiation over time at a slower rate than the consumable nodes;

b) determining an amount of radiation damage sustained by at least a portion of the resilient nodes as a result of exposure to the ionizing radiation using a base station; and c) determining a dosage of the ionizing radiation received by at least a portion of the resilient nodes using the base station based on a pre-determined correlation between ionizing radiation dosage and the amount of radiation damage sustained by the consumable nodes.

The resilient nodes and consumable nodes may be randomly distributed within the target area.

At least a portion of the resilient nodes are positioned within the target area in a pre-determined pattern. The consumable nodes may be randomly distributed amongst the at least a portion of the resilient nodes.

At least a portion of the resilient nodes may provide a minimum spatial resolution of the system. The presence of the first plurality of consumable nodes may provide an operating spatial resolution that is greater than the minimum spatial resolution.

Each consumable node may be indirectly communicably linked to the base station by at least one resilient node.

The plurality of consumable nodes and resilient nodes may be communicably linked to form a plurality of clusters. Each cluster may include at least one resilient node configured as a cluster head node and communicably linked to the base station and at least one consumable node communicably linked to the cluster head node and therefore indirectly linked to the base station via the cluster head node.

The cluster head nodes of each cluster may be communicably linked together to provide a communication backbone that is in communication with the base station. The consumable nodes may be communicably linked to the communication backbone.

The communication backbone may be free from consumable nodes.

The method may include deploying a second plurality of consumable nodes into the target area after at least some of the first plurality of consumable nodes have been rendered inoperable due to exposure to the ionizing radiation.

At least a portion of the second plurality of consumable nodes may be communicably linked to the base station by one of the first plurality of consumable nodes.

At least one of the resilient nodes may be simultaneously communicably linked to at least one of the first plurality of consumable nodes and at least one of the second of the plurality of consumable nodes.

The first plurality of consumable nodes may be air dropped into the target zone.

The base station may be outside the target zone and may not be exposed to the ionizing radiation.

In accordance with another broad aspect of the teachings disclosed herein a system for monitoring an environmental condition in a target area may include a first plurality of consumable nodes deployable within the target area to be exposed to the environmental condition. Each consumable node may be progressively damageable over a monitoring time as a result of exposure to the environmental condition. A plurality of resilient nodes may be deployable within the target area amongst the consumable nodes to be exposed to the environmental condition. Each resilient node may be progressively damageable over the monitoring time as a result of exposure to the environmental condition at a slower rate than the consumable nodes. A base station may be communicably linked to the consumable nodes and may be operable to detect the amount of environmental damage sustained by the consumable nodes and to determine an attribute of the environmental condition based on a pre-determined correlation between the attribute of the environmental condition and the amount of environmental damage sustained by the consumable node. The first plurality of consumable nodes and the plurality resilient nodes may be communicably linked in a plurality of clusters. Each cluster may have at least one resilient node communicably linked to the base station and at least one consumable node indirectly linked to the base station via the one of the resilient nodes.

In accordance with another broad aspect of the teachings disclosed herein, a self-organizing wireless sensor network may include a plurality of first nodes, a plurality of second nodes that are different than the first nodes and a base station for receiving data from the plurality of first and second nodes. The plurality of first nodes and second nodes may be communicably linked with each other to form a plurality of clusters. Each cluster may have a mixture of first nodes and second nodes and may have a designated cluster head node. The cluster head node of each cluster may be a first node.

Each second node may be indirectly communicably linked to the base station by at least one first node.

The cluster head nodes may be communicably linked to each other to provide a communication backbone in communication with the base station. Each second node may be communicably linked to the communication backbone.

The wireless sensor network may be deployable for monitoring an environmental condition in a target area. The second nodes may be configured as consumable nodes that are progressively damageable over a monitoring time as a result of exposure to the environmental condition. The first nodes may be configured as resilient nodes that are being progressively damageable over the monitoring time as a result of exposure to the environmental condition at a slower rate than the second nodes. The base station may be operable to detect the amount of environmental damage sustained by the consumable nodes and to determine an attribute of the environmental condition based on a pre-determined correlation between the attribute of the environmental condition and the amount of environmental damage sustained by the consumable node.

The environmental condition may include ionizing radiation, and wherein each consumable node may include at least one electronics module that is progressively damageable over the monitoring time as a result of exposure to the ionizing radiation.

Each resilient node may include a first electronics module that is protected by radiation shielding, and at least one sacrificial electronics module that is positioned outside the radiation shielding and is progressively damageable over the monitoring time as a result of exposure to the ionizing radiation. The first electronics module may survive longer than the at least one sacrificial electronics module when the resilient node is exposed to the ionizing radiation.

A first failure rate associated with the consumable nodes failing due to the environmental condition may be greater a second failure rate of the resilient nodes failing due to the environmental condition.

The plurality of first nodes may be configured to communicate with the base station using a first communication protocol. The plurality of second nodes may be configured to communicate with the first class sensor nodes using a second communication protocol.

Each first node may be further configured to communicate with another first node using the second communication protocol.

The number of second nodes may be greater than the number of first nodes

The number of first nodes may include 12.5% of the total number of first nodes and second nodes.

The number of first nodes may include 25% of the total number of first nodes and second nodes.

The number of first nodes may include 50% of the total number of first nodes and second nodes.

The first nodes may be randomly deployable within a target area.

The wireless sensor network may be deployable for monitoring an environmental condition in a target area. The second nodes may be configured as consumable nodes that are progressively damageable over a monitoring time as a result of exposure to the environmental condition. The first nodes may be configured as radiation-resistant nodes that are being progressively damageable over the monitoring time as a result of exposure to the environmental condition at a slower rate than the second nodes. The base station may be operable to detect the amount of environmental damage sustained by the consumable nodes and to determine an attribute of the environmental condition based on a pre-determined correlation between the attribute of the environmental condition and the amount of environmental damage sustained by the consumable node.

In accordance with another broad aspect of the teachings described herein, a system for monitoring ionizing radiation in a target area may include a first plurality of consumable nodes deployable within the target area to be exposed to the ionizing radiation. Each consumable node may be progressively damageable over a monitoring time as a result of exposure to the ionizing radiation. A plurality of radiation-resistant nodes may be deployable within the target area amongst the consumable nodes to be exposed to the ionizing radiation. A base station may be communicably linked to the consumable nodes and operable to detect an amount of radiation damage sustained by the consumable nodes and to determine a dosage of ionizing radiation received by any one of the consumable nodes based on a pre-determined correlation between the dosage of ionizing radiation and the amount of radiation damage sustained by the consumable node. The first plurality of consumable nodes and the plurality of radiation-resistant nodes may be communicably linked in a plurality of clusters, wherein each cluster includes at least one radiation-resistant node communicably linked to the base station and at least one consumable node indirectly linked to the base station via the one of the radiation-resistant nodes.

The base station may communicate with the consumable nodes at a communication interval that is less than about 4 seconds.

DRAWINGS

The drawings included herewith are for illustrating various examples of articles, methods, and apparatuses of the teaching of the present specification and are not intended to limit the scope of what is taught in any way.

In the drawings:

FIG. 1 is a schematic representation of one example of an indirect monitoring system;

FIG. 2 is a schematic representation of another example of an indirect monitoring system;

Figure 9:
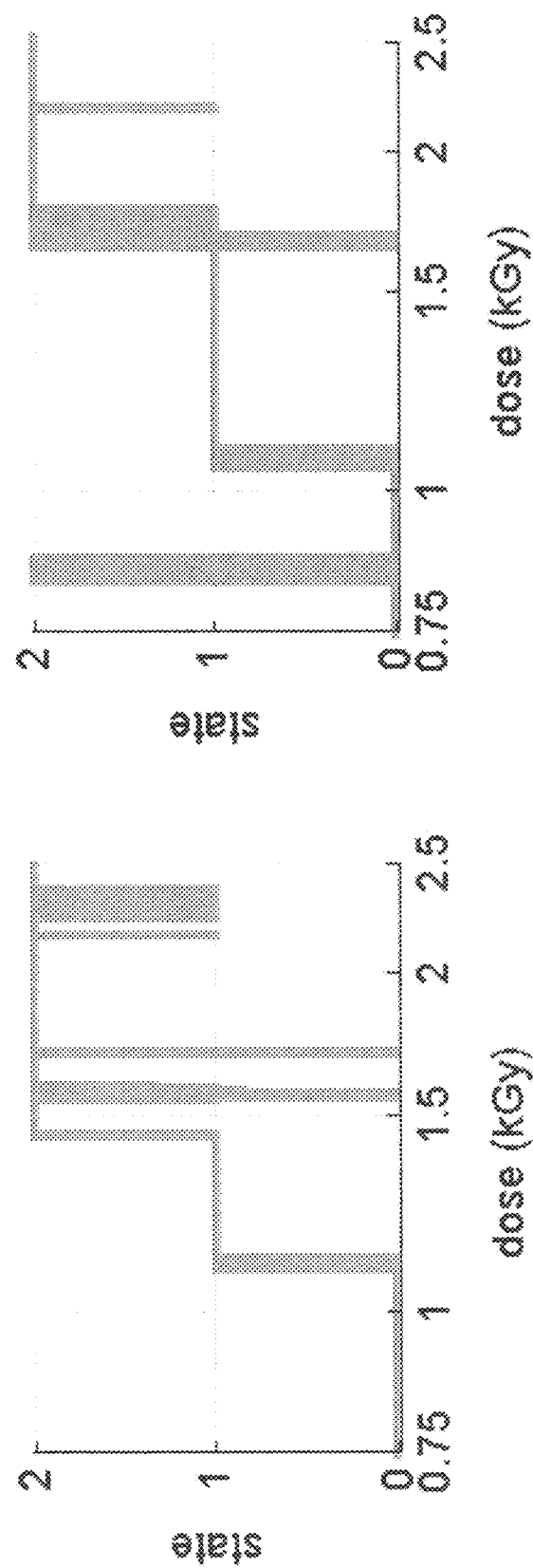
Figure 10:
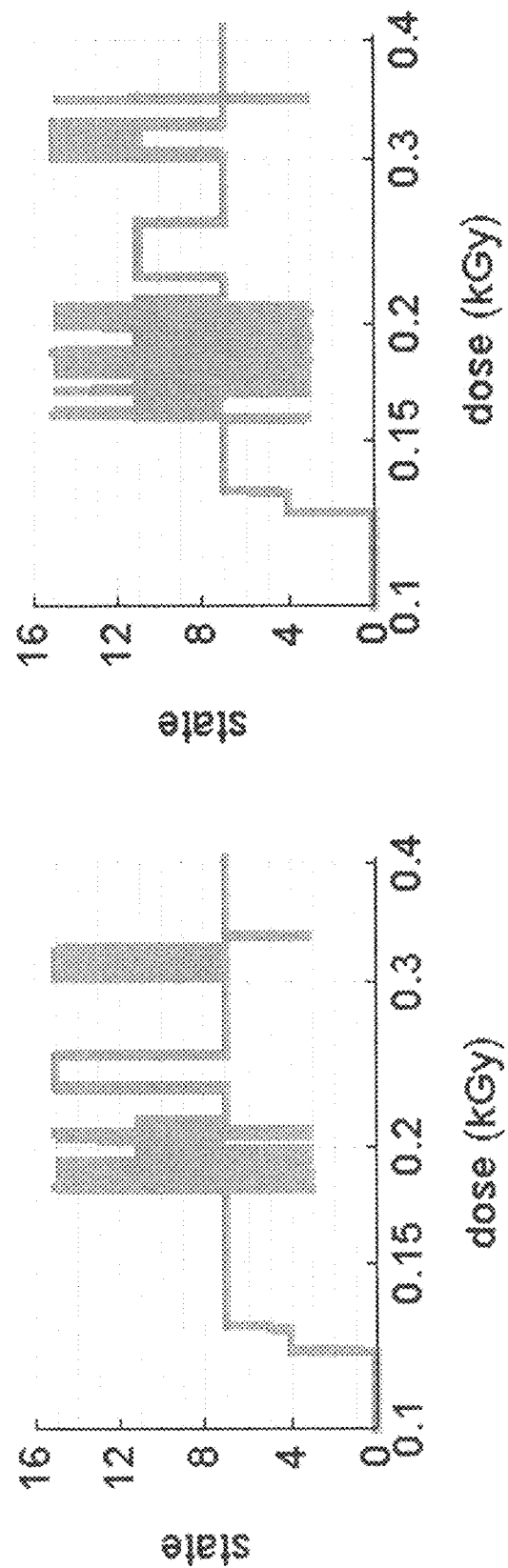
Figure 11:
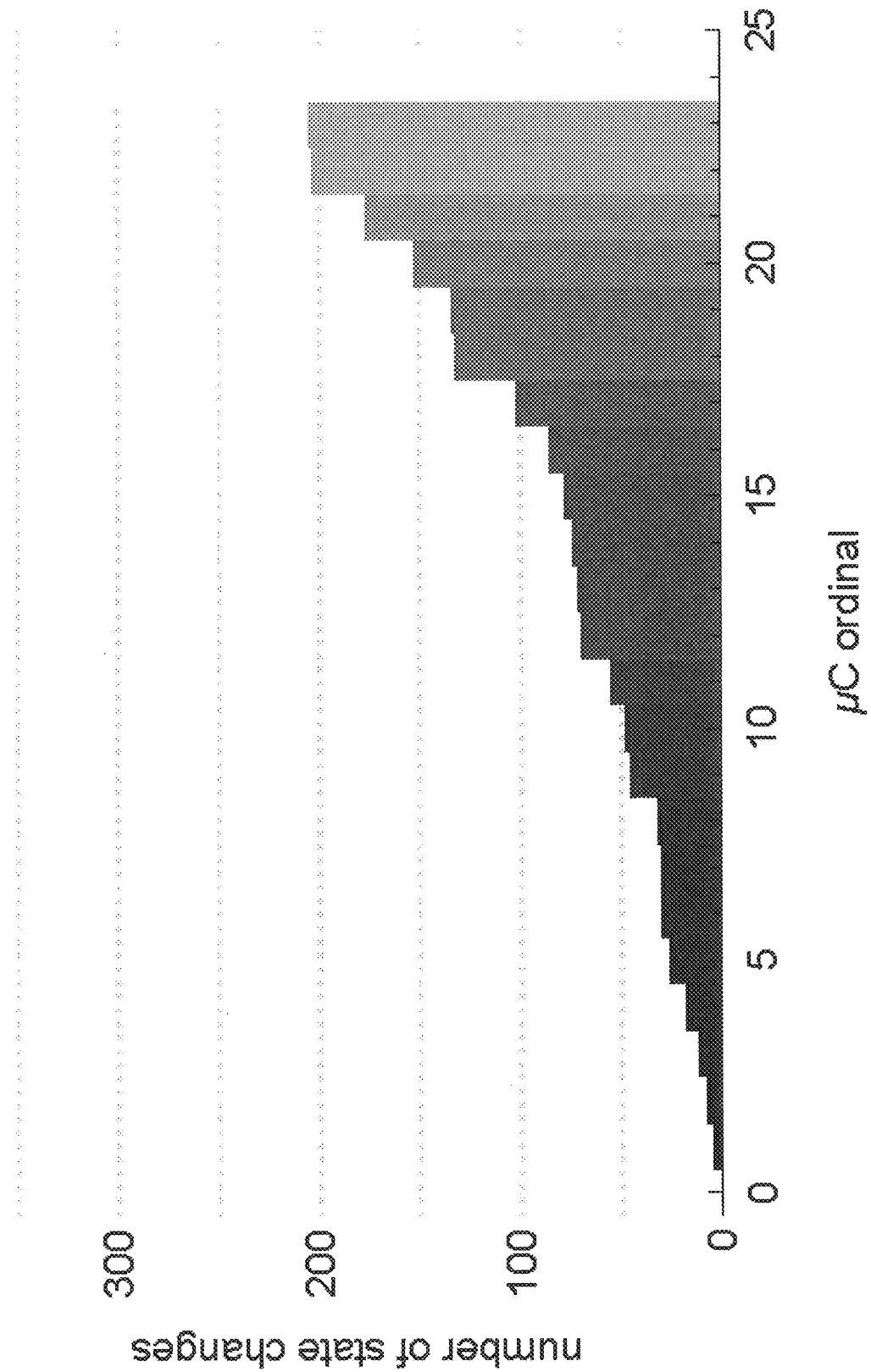
Figure 12:
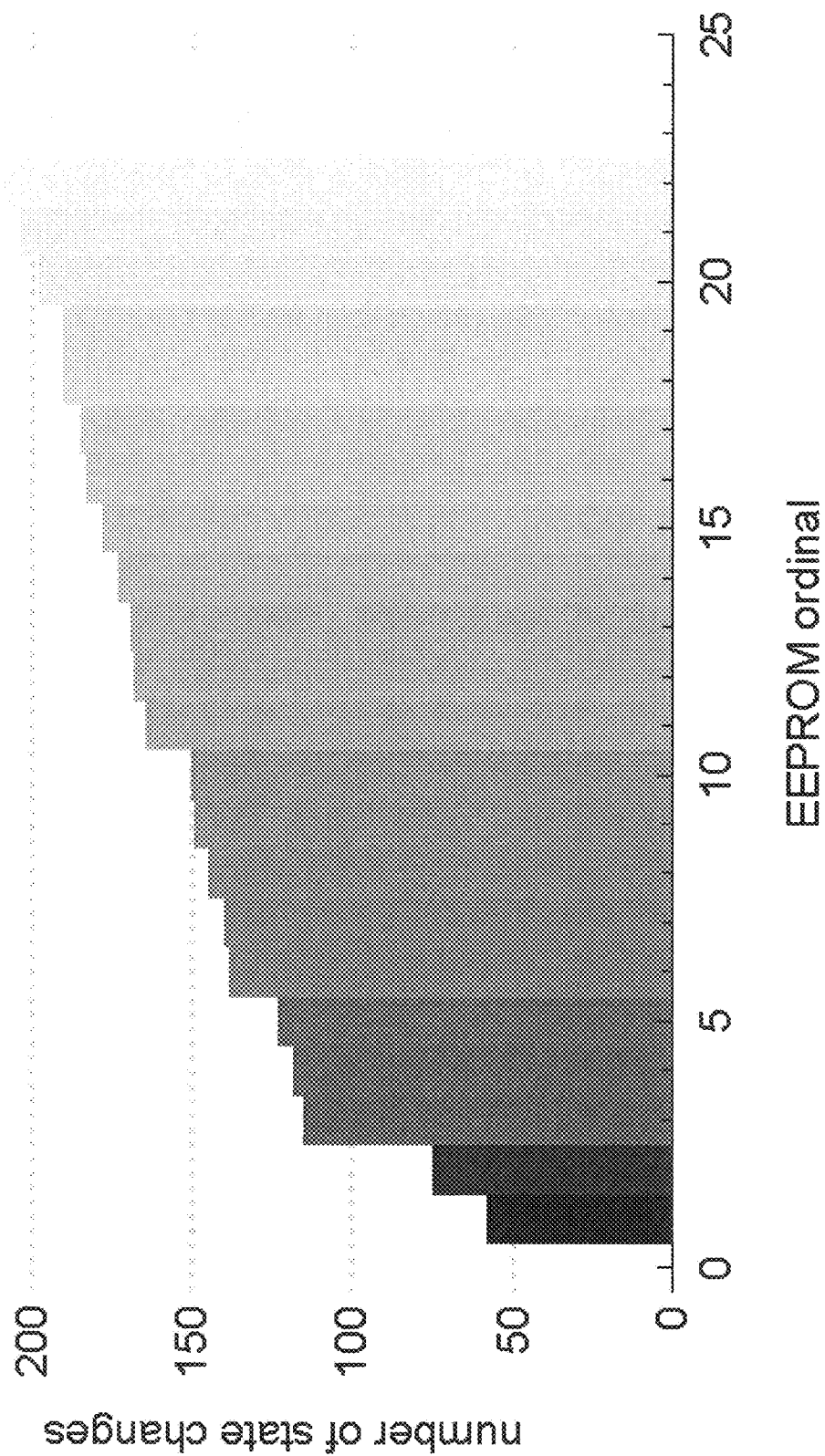
Figure 13:
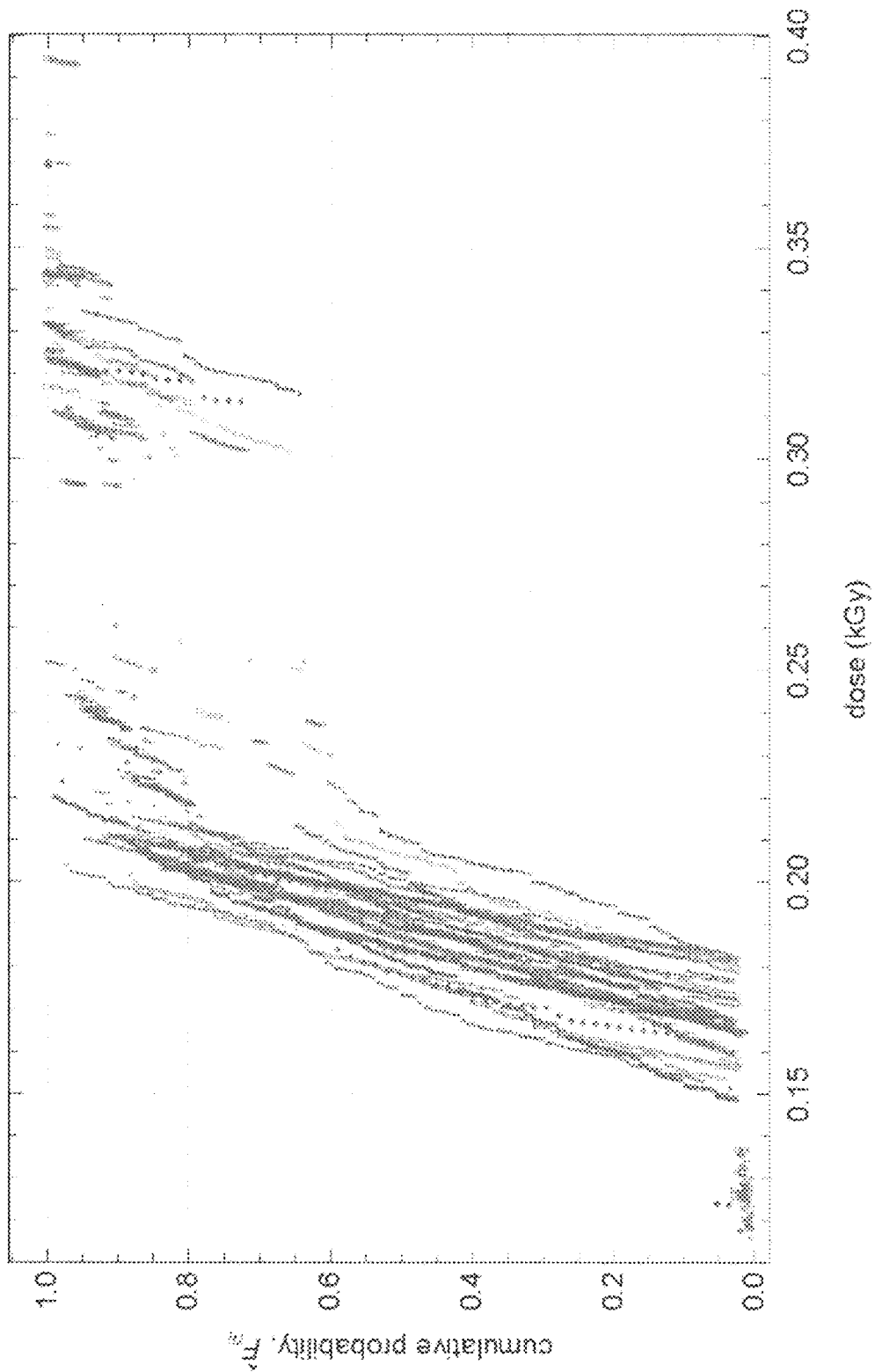
Figure 14:
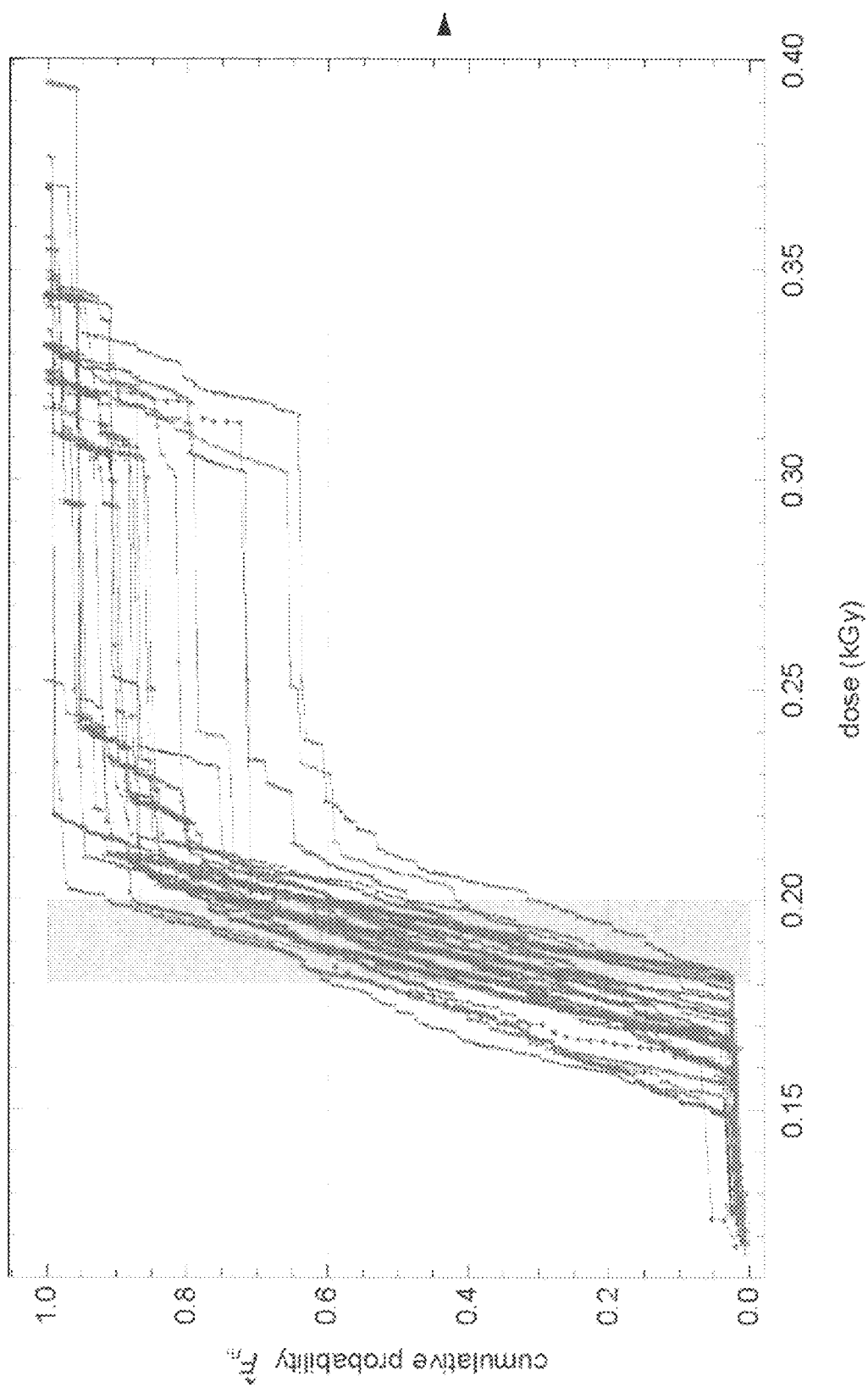
Figure 15:
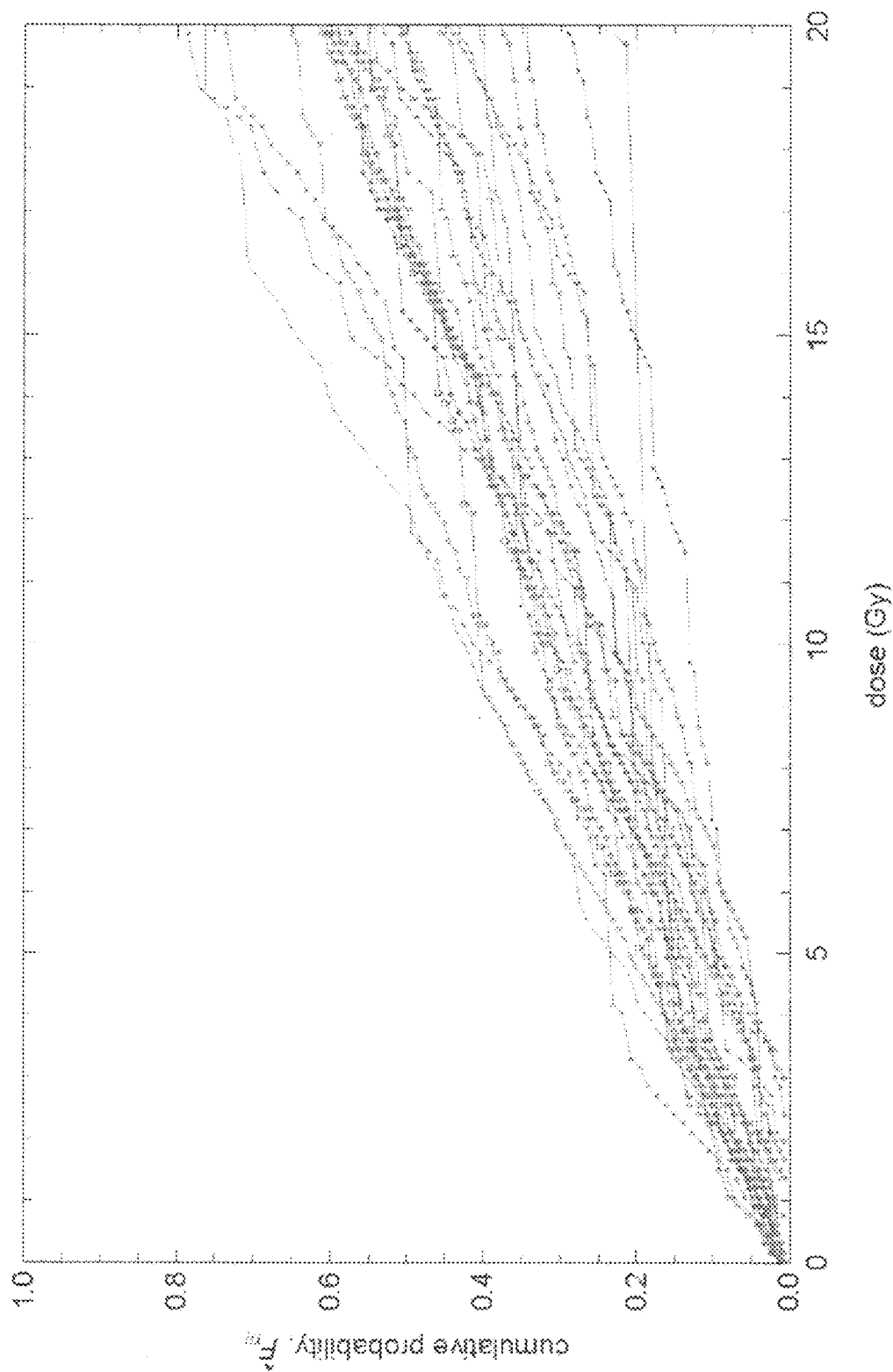
Figure 16:
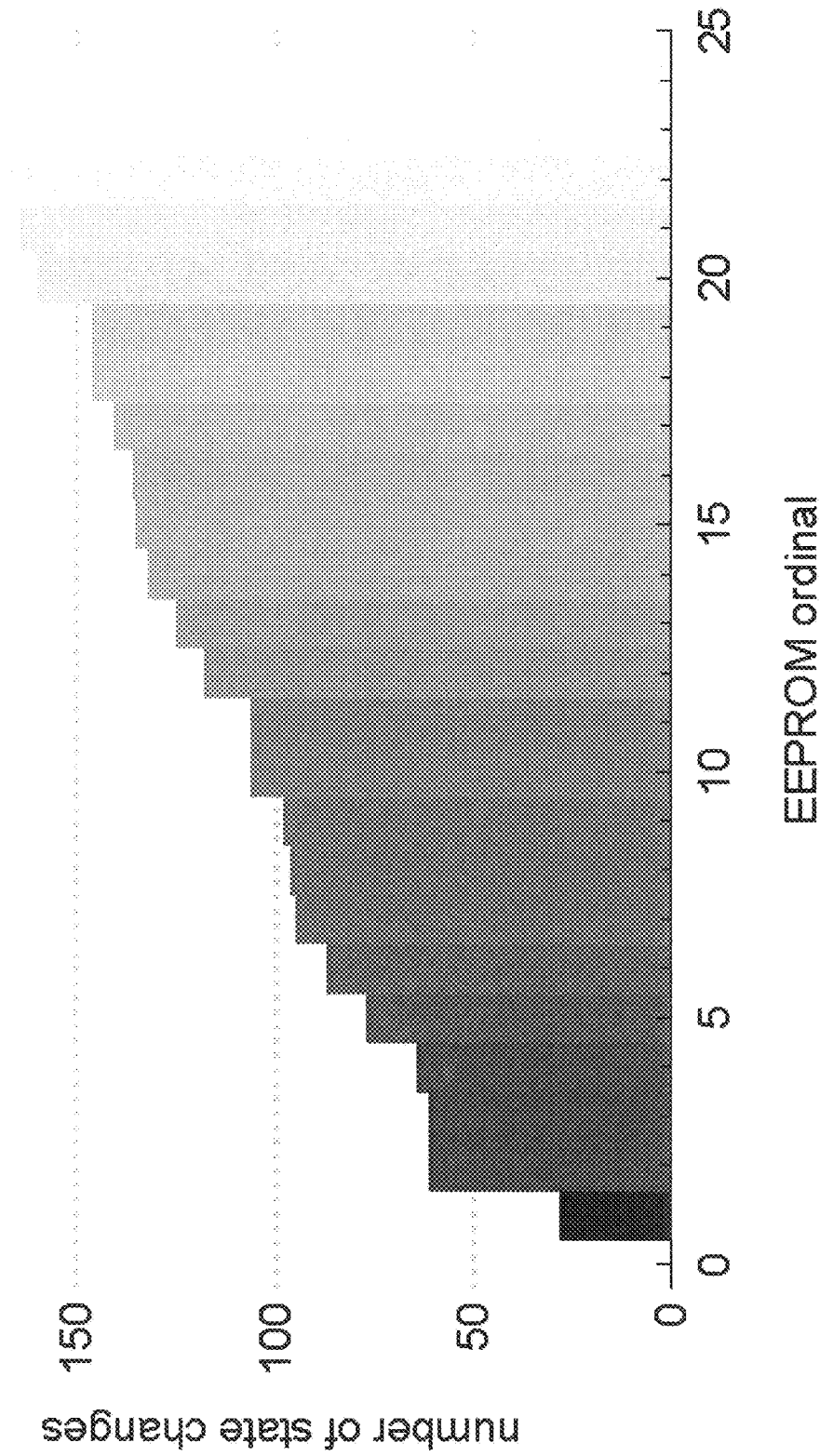
Figure 17:
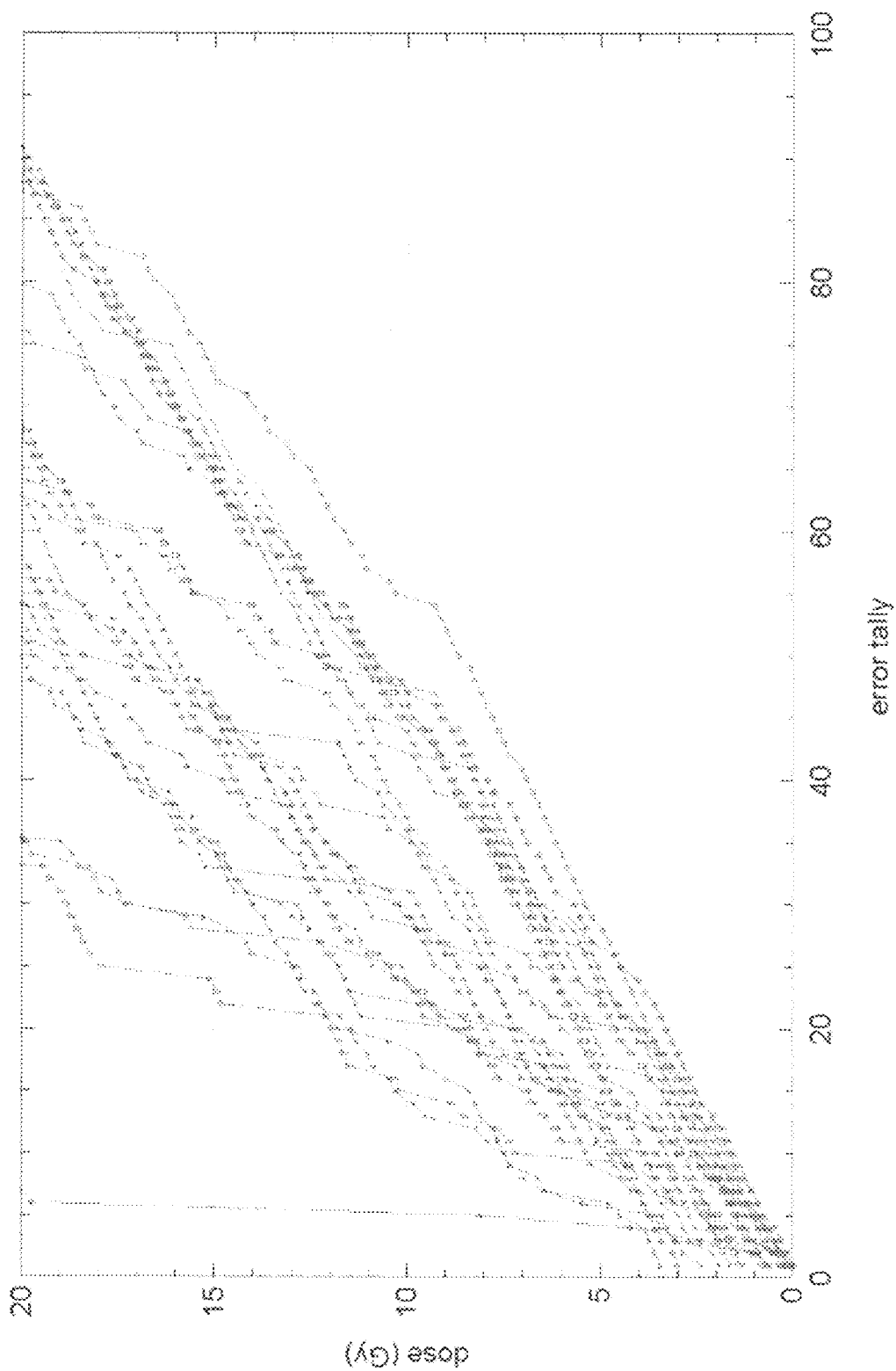
Figure 18:
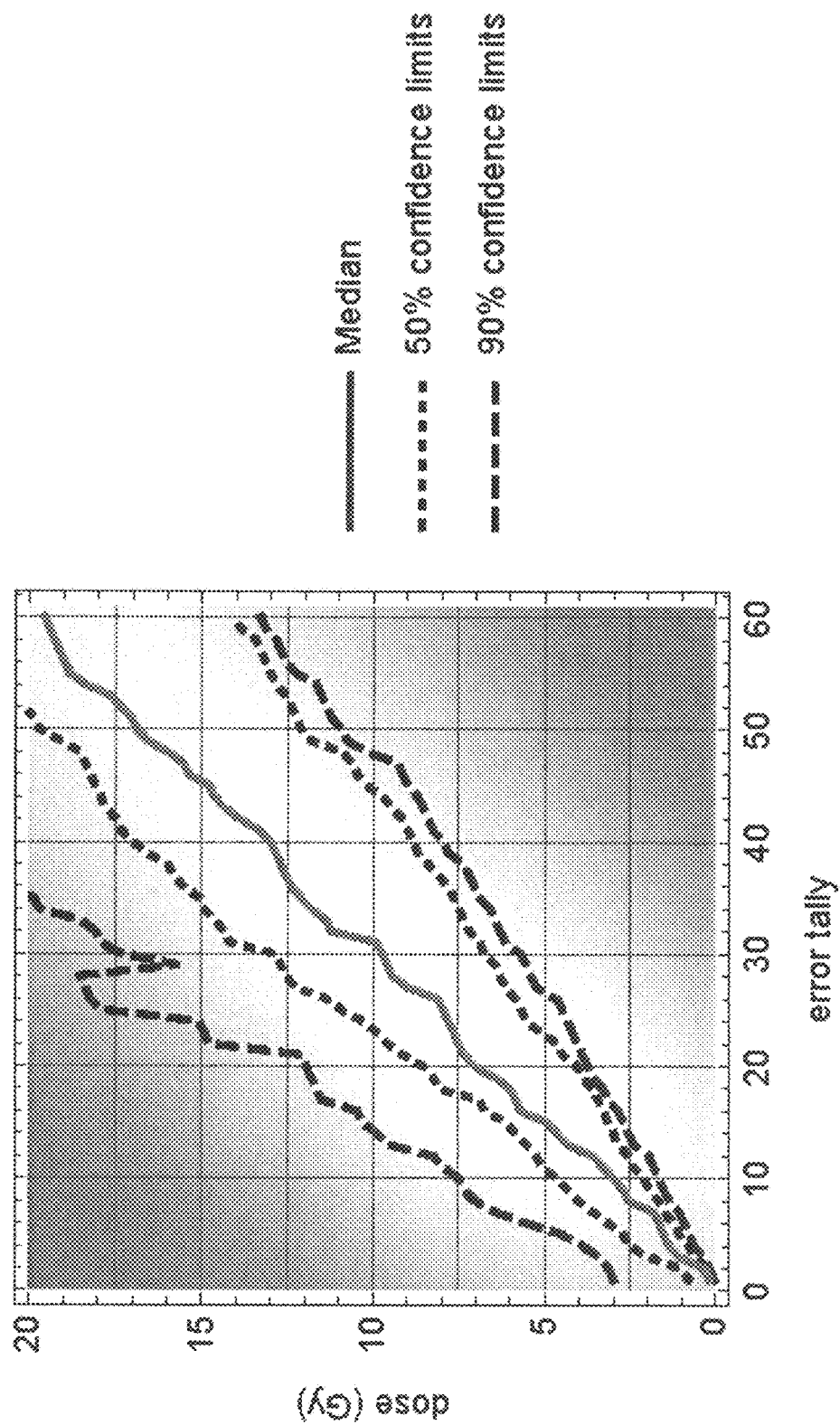
Figure 19:
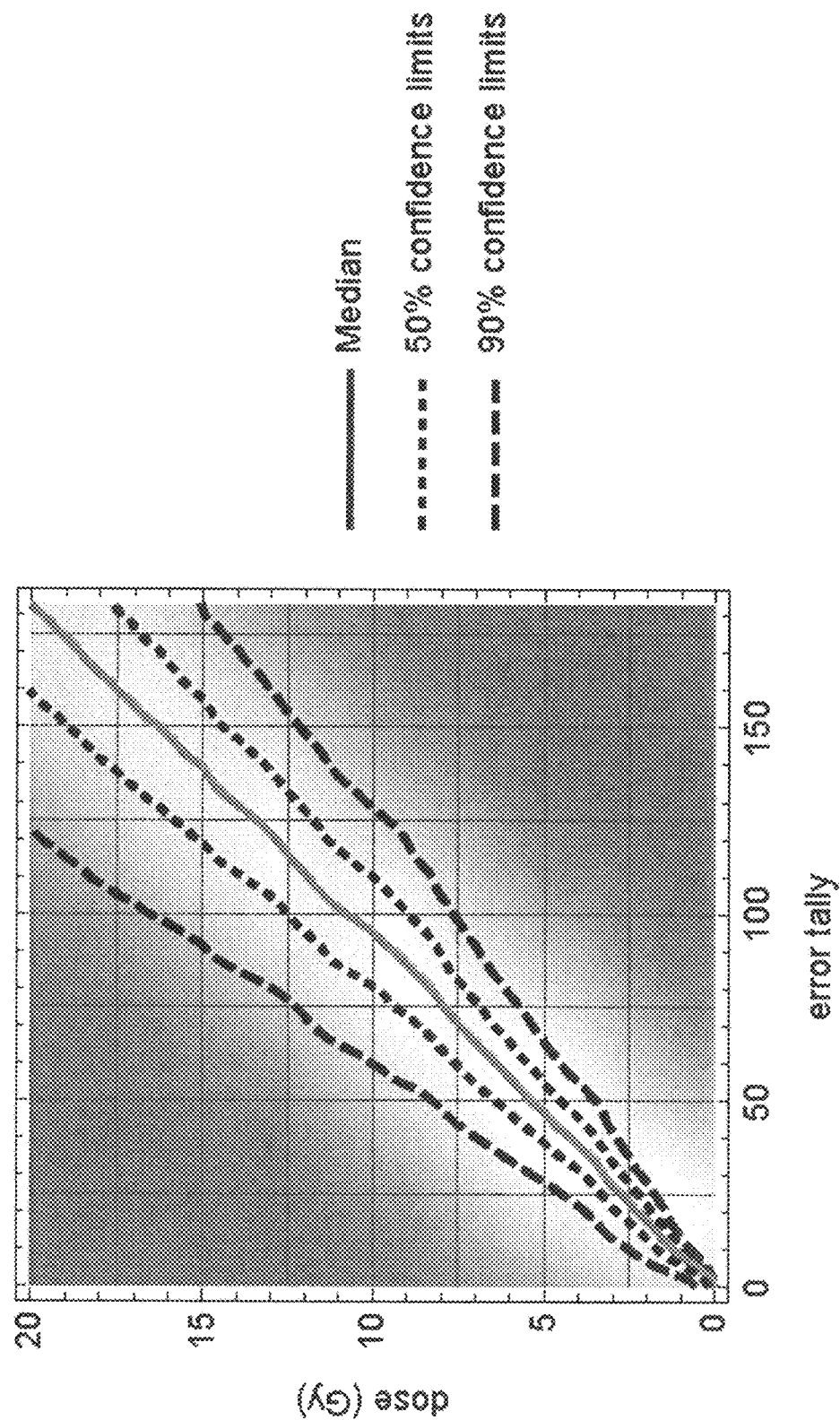
Figure 20A:
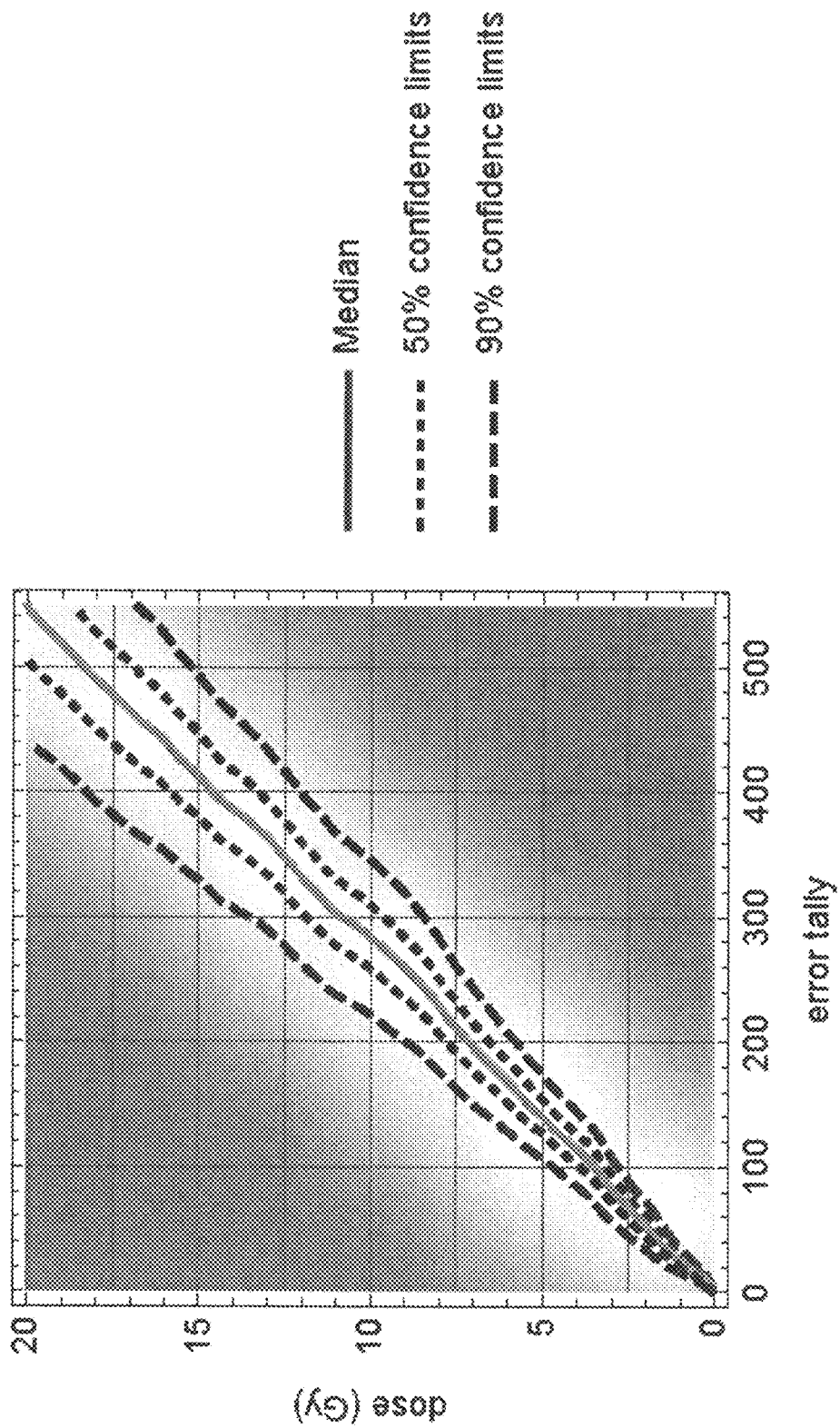
Figure 20B:
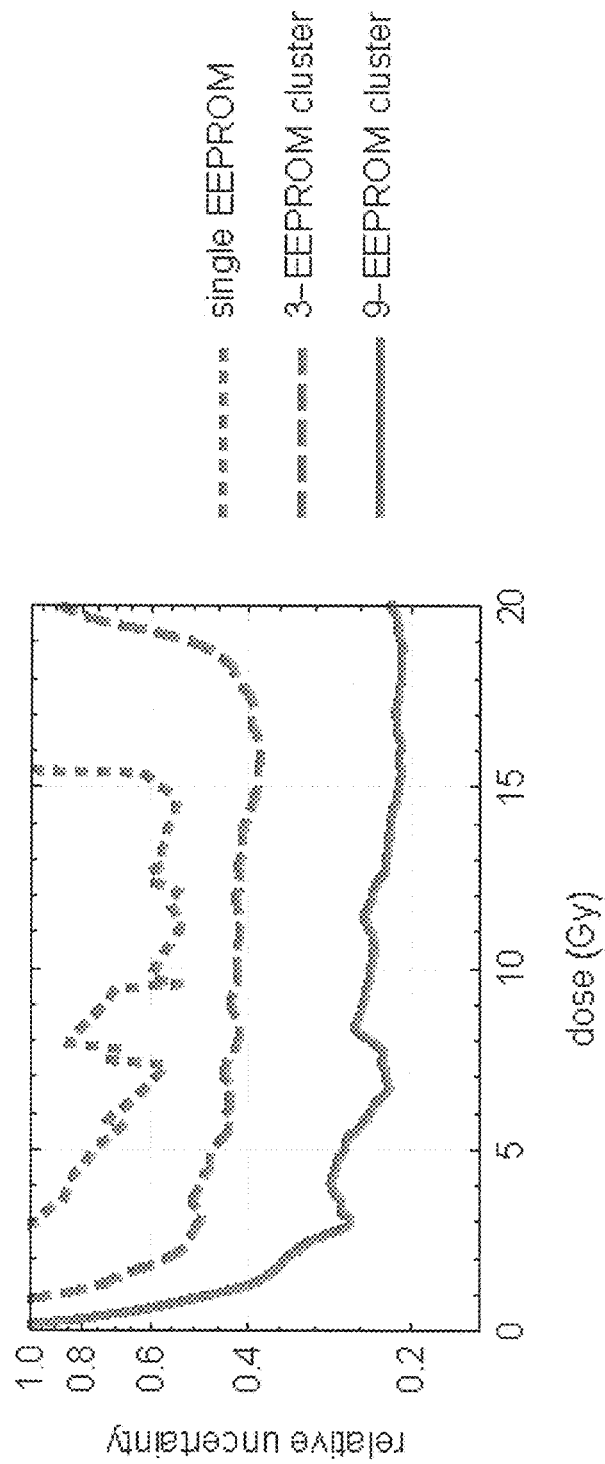
Figure 21:
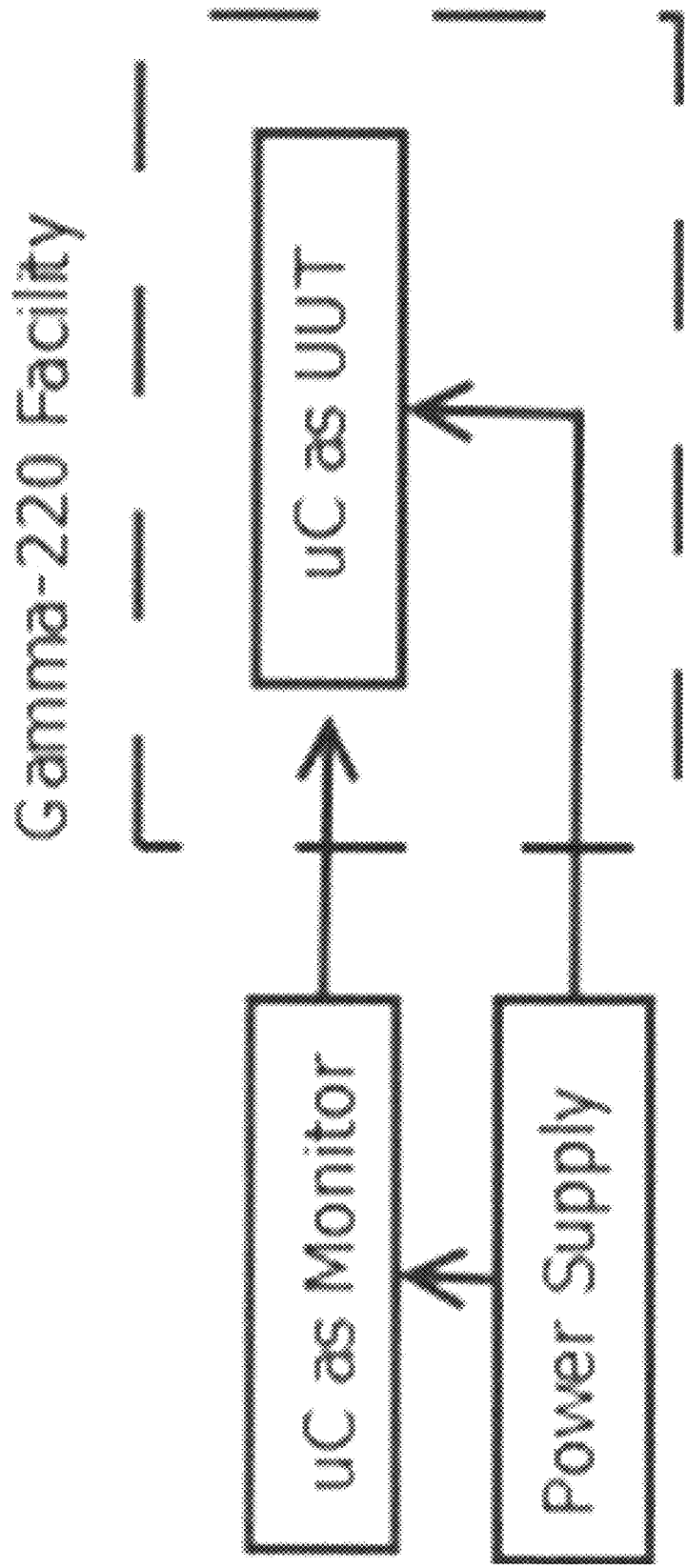
Figure 22:
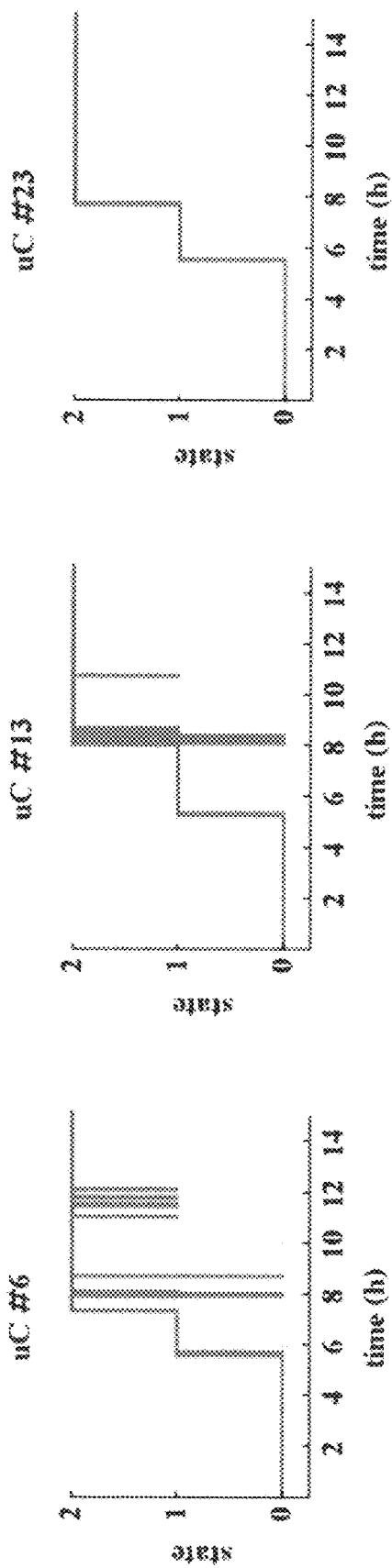
Figure 23:
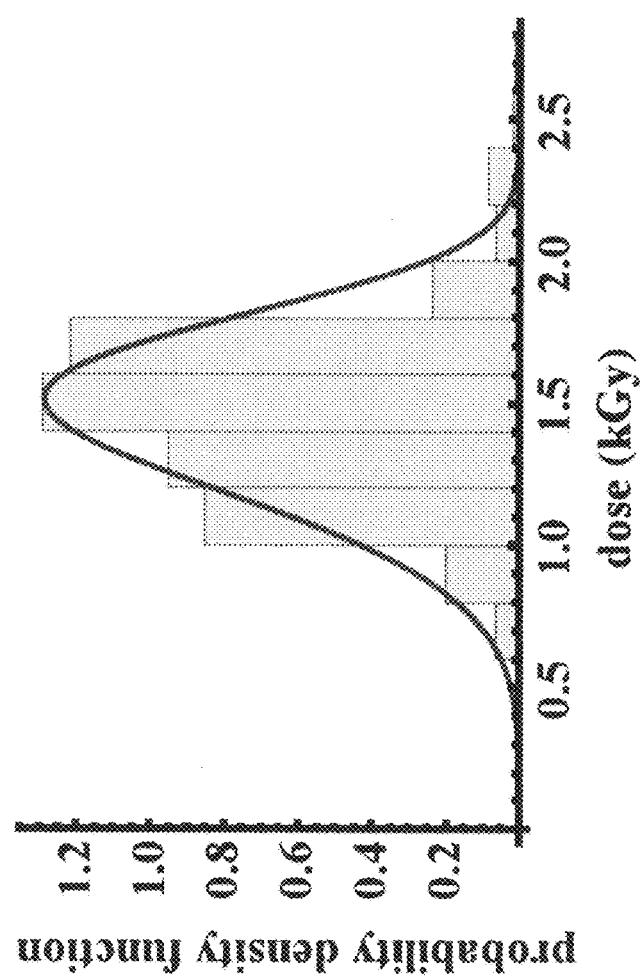
Figure 24:
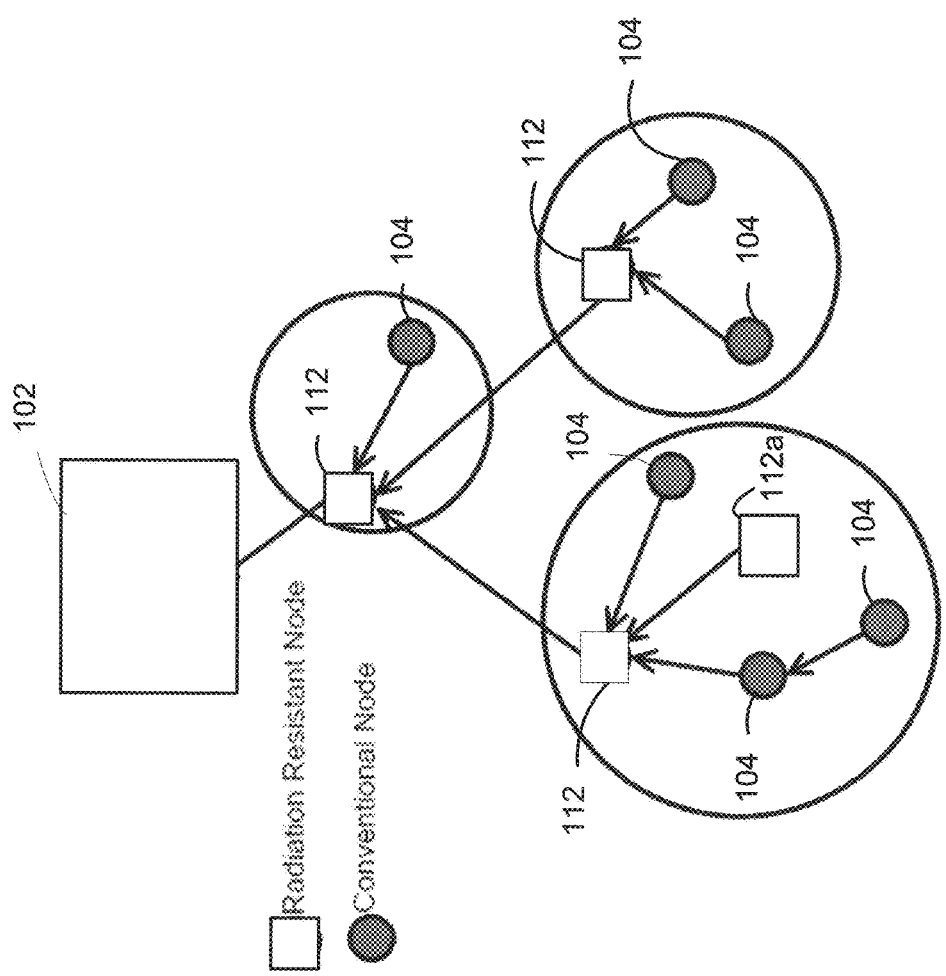
Figure 25:
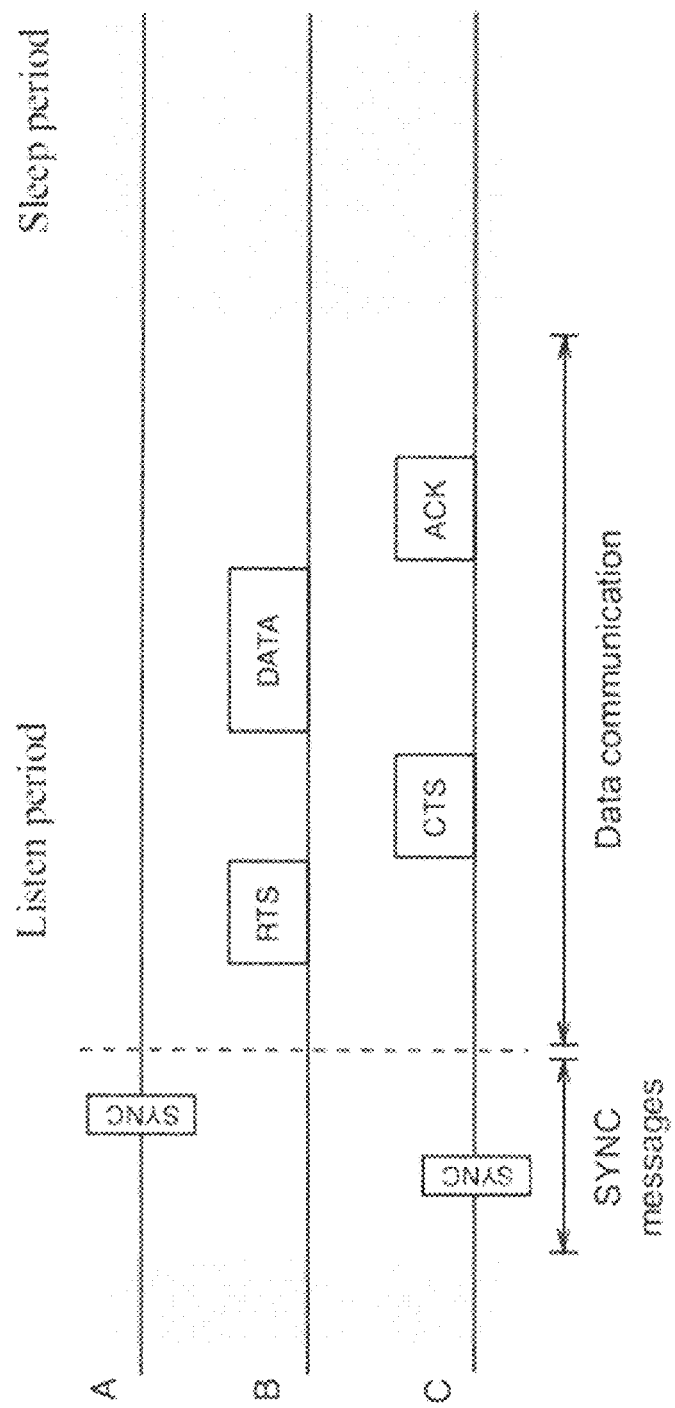
Figure 26:
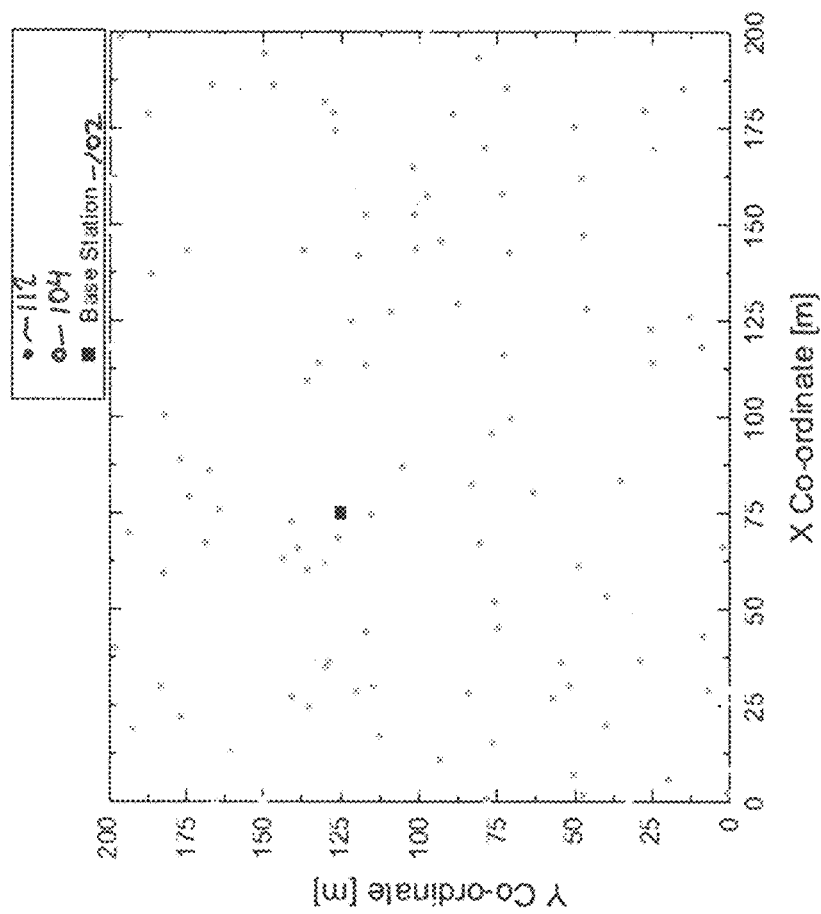
Figure 27:
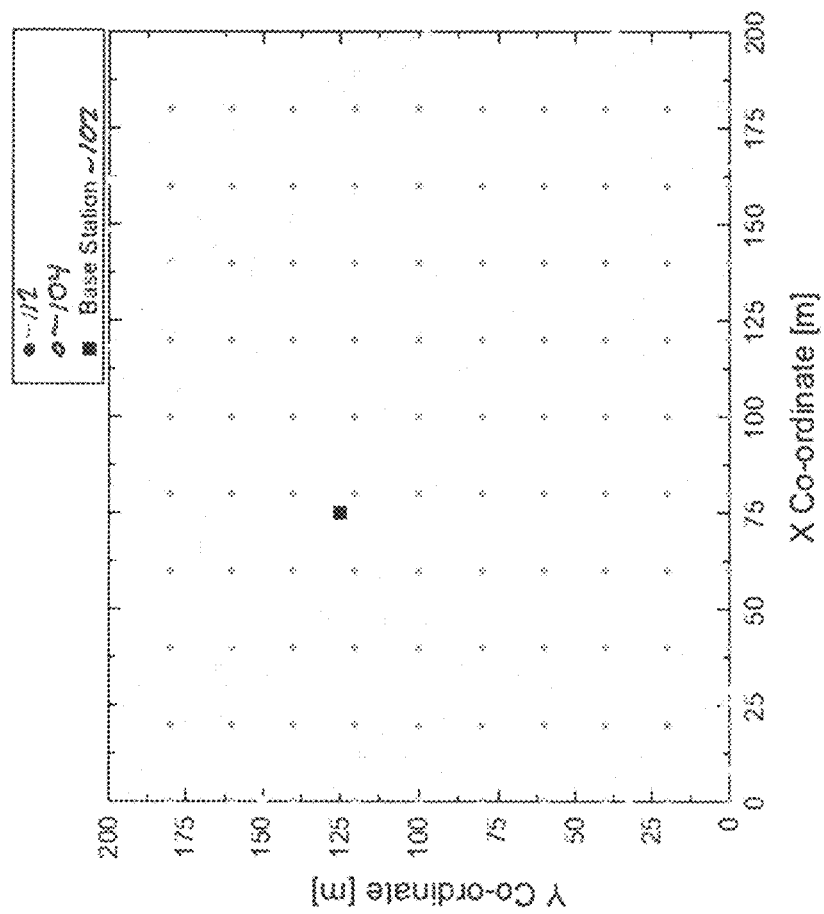
Figure 28:
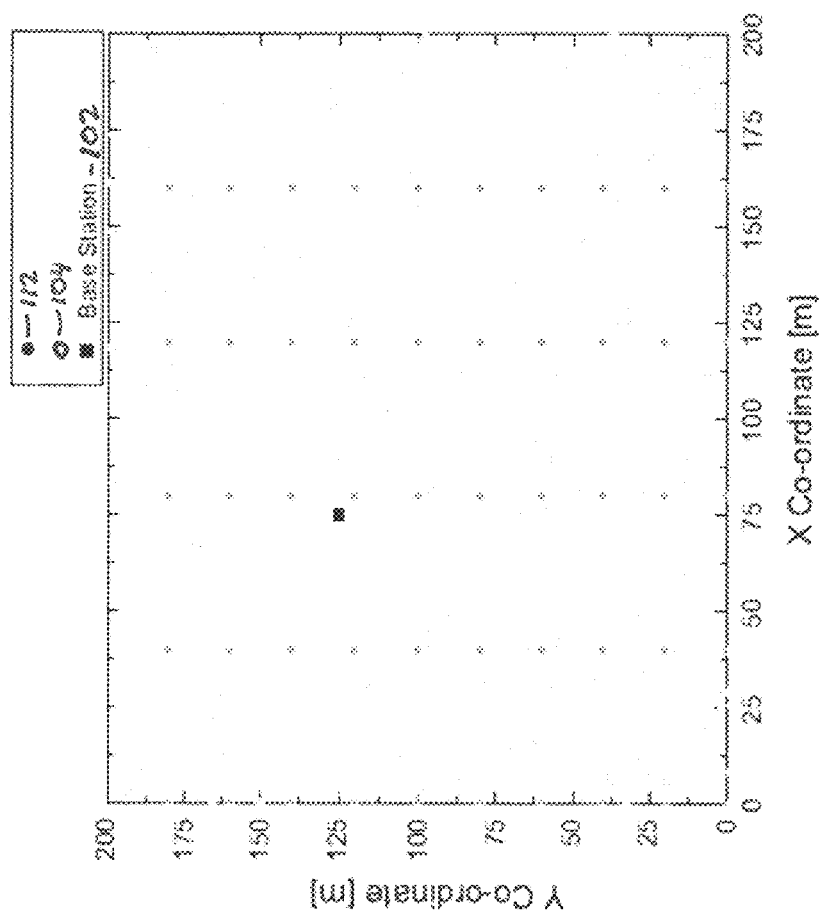
Figure 29:
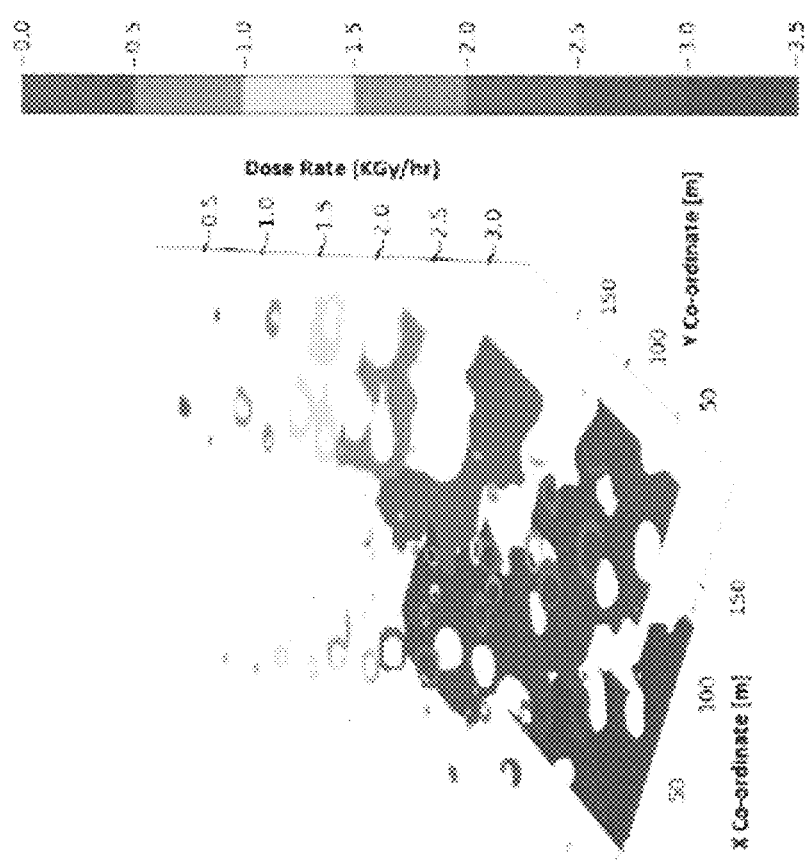
Figure 30:
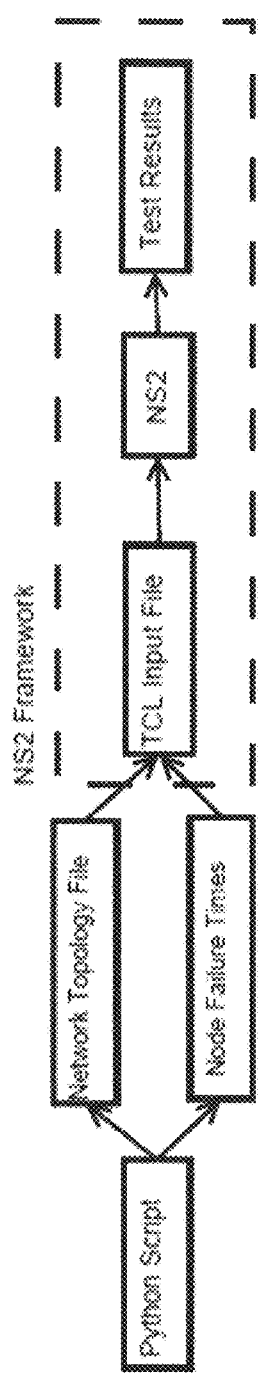
Figure 31:
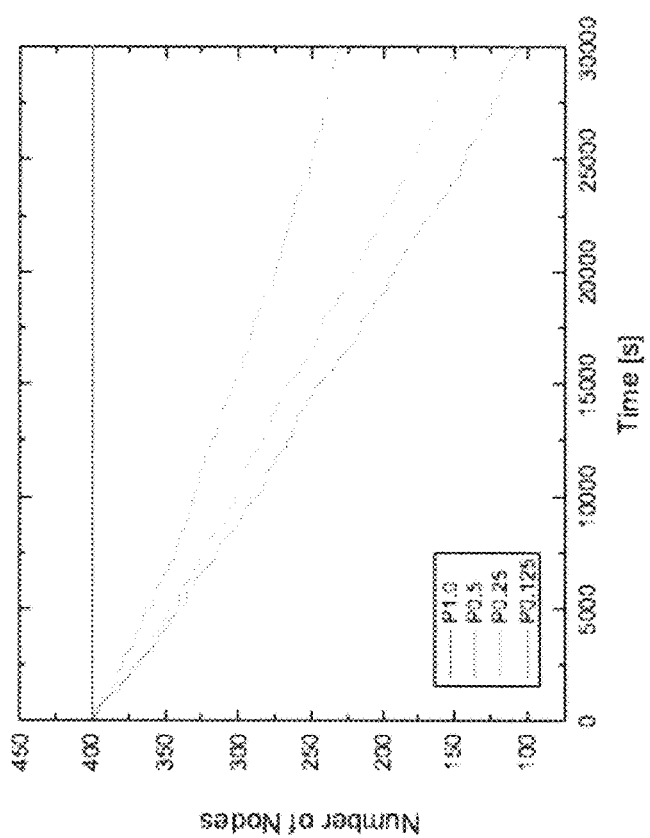
Figure 32:
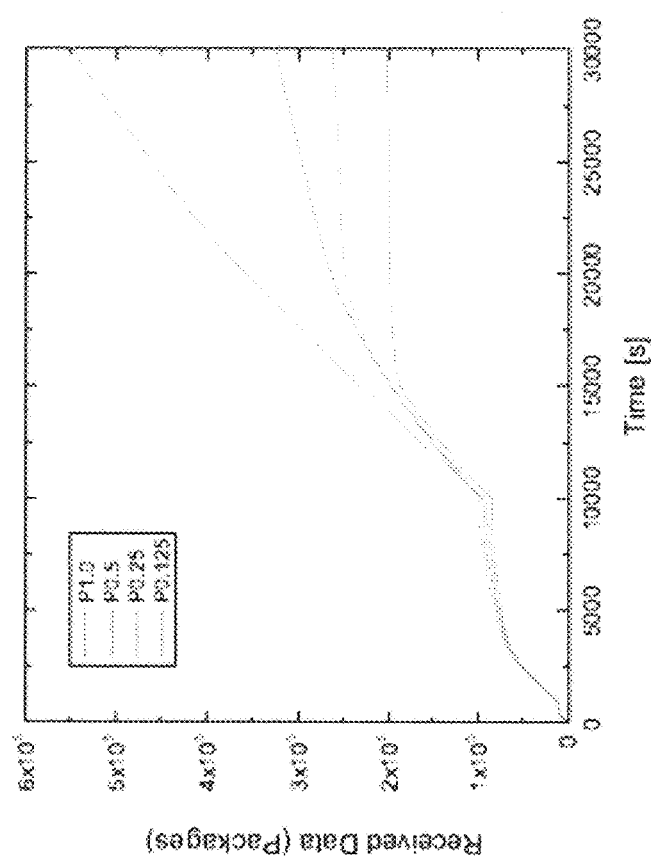
Figure 33:
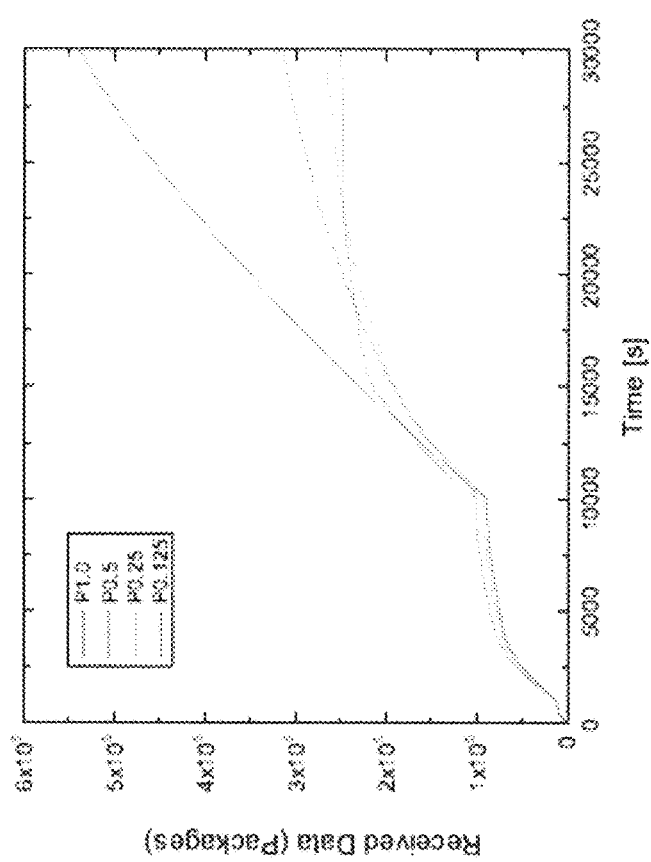

FIG. 9 includes examples of microcontroller state-dependence on gamma radiation dose from two different microcontrollers;

FIG. 10 includes examples of EEPROM state-dependence on gamma radiation dose from two different EEPROMs;

FIG. 11 is a chart showing the number of state changes, ordered by increasing value, recorded for each of 24 irradiated microcontrollers;

FIG. 12 is a chart showing the number of state changes, ordered by increasing value, recorded for each of 24 irradiated EEPROMs;

FIG. 13 is a plot showing the cumulative distribution functions of dose for 24 individual EEPROMs;

FIG. 14 is a plot showing the interval of strong response of the cumulative distribution functions of dose for 24 individual EEPROMs;

FIG. 15 is a graph showing threshold-free gap-free cumulative distribution functions of dose for 24 pre-irradiated individual EEPROMs, plotted on an interval of 0-20 Gy;

FIG. 16 is a chart showing the number of state changes, ordered by increasing value, for each of 24 pre-irradiated EEPROMs;

FIG. 17 is a chart showing inverse cumulative distribution functions of dose for 24 pre-irradiated individual EEPROMs plotted on the interval of 0-20 Gy;

FIG. 18 is a plot showing a relation of dose to error tallies from inverse CDFs of 24 pre-irradiated EEPROMS;

FIG. 19 is a plot showing the relation of dose to error tallies from inverse CDFs of 2024 unique clusters of 3 pre-irradiated EEPROMs;

FIG. 20*a* is a plot showing the relation of dose to error tallies from inverse CDFs of $2 \times 10^4$ equally probable clusters of 9 randomly chosen pre-irradiated EEPROMs;

FIG. 20*b* is a plot showing the comparison of estimated relative uncertainty in dose measurements for a single EEPROM and clusters of 3 and 9 EEPROMs;

FIG. 21 is a block diagram illustrating a radiation hardness test;

FIG. 22 is a plot showing examples of microcontroller state vs time during gamma-ray irradiation;

FIG. 23 is an absorbed-dose histogram and fitted PDF for Weibull-distributed microcontroller state changes;

FIG. 24 is a schematic diagram of a hierarchical clustering WEN topology formed by LEACH-R;

FIG. 25 is a schematic work flow diagram of S-MAC;

FIG. 26 is a plot of a 400-node test network in which all nodes are deployed randomly, following a uniform distribution in space (the base station is located at x=75, y=125);

FIG. 27 is a plot of a 400-node test network in which 100 resilient nodes are deployed at square grids (20 m between each other) and the remaining 300 nodes are deployed randomly, following a uniform distribution in space (the base station is located at x=75, y=125);

FIG. 28 is a plot of a 400-node test network in which 50 resilient nodes are deployed at the square grids (40 m between each other) and the remaining 350 nodes are deployed randomly, following a uniform distribution in space (the base station is located at x=75, y=125);

FIG. 29 is a map of simulated radiation field strength in the horizontal plane. In the 3D plot, the position of points in the horizontal plane correspond to spatial distances X and Y from the origin, in arbitrary units of length. The positions of points in the vertical, Z, dimension correspond to the base-10 logarithm of dose-rate, measure in kGy/hr;

FIG. 30 is a schematic representation of a framework for experiments through NS2 with radiation damage distribution;

FIG. 31 is a plot showing a comparison of alive nodes over time (s). P1.0 is the ratio of nodes as resilient ones in the WSN is 100%, P0.5 is 50%, P0.25 is 25% and P0.125 is 12.5%;

FIG. 32 is a plot showing comparison data collected over time (s), and nodes deployment refers to the FIG. 26. P1.0 is the ratio of nodes as resilient ones in the WSN is 100%, P0.5 is 50%, P0.25 is 25% and P0.125 is 12.5%; and FIG. 33 is a plot showing comparison data collected over time (s), and nodes deployment refers to the FIGS. 27 and 28. P1.0 is the ratio of nodes as resilient ones in the WSN is 100%, P0.5 is 50%, P0.25 is 25% and P0.125 is 12.5%.

DETAILED DESCRIPTION

Various apparatuses or processes will be described below to provide an example of an embodiment of each claimed invention. No embodiment described below limits any claimed invention and any claimed invention may cover processes or apparatuses that differ from those described below. The claimed inventions are not limited to apparatuses or processes having all of the features of any one apparatus or process described below or to features common to multiple or all of the apparatuses described below. It is possible that an apparatus or process described below is not an embodiment of any claimed invention. Any invention disclosed in an apparatus or process described below that is not claimed in this document may be the subject matter of another protective instrument, for example, a continuing patent application, and the applicants, inventors or owners do not intend to abandon, disclaim or dedicate to the public any such invention by its disclosure in this document.

Gamma radiation refers to electromagnetic radiation of an extremely high frequency, consisting of high-energy photons. Gamma-rays are usually generated by isotopic decay, in which an atomic nucleus transitions from a high energy unstable state to a lower energy stable state. In outer space, cosmic radiation includes a large portion of gamma-rays from a number of sources (e.g., supernova, the sun). In nuclear power plants, gamma-rays can present a radiation safety hazard, the intensity of which is carefully monitored.

Measurement of gamma radiation dose can be helpful for making informed responses to, and intervening in, the course of radiological events that occur on the spatiotemporal scales of the Chernobyl and Fukushima Daiichi nuclear power plant accidents. Such events may be characterized by physical quantities (including radiation dose), values of which may exhibit variation on local spatiotemporal intervals that can be small compared to the magnitudes of the space and time domains spanned by the accidents. In the design of potential dose measurement systems suited to such characteristics, the size disparity between the local spatiotemporal intervals required to capture local variations and the much larger magnitudes of the space and time domains compels high-resolution discretization (in relative terms) of the domains.

In early work related to the subject, challenges unique to the effects of ionizing radiation on wireless sensor networks (WSNs) deployed in aerospace applications were acknowledged. Techniques for providing ionizing-radiation-induced-fault tolerance in WSNs deployed in nuclear power plant monitoring systems have been proposed and investigated. Radiation detection systems designed to optimize stable collection and transmission of radiation dose data over WSNs using low-power radio frequency communication protocols have also been proposed.

However, despite such previous work, the current dose-measurement systems, using conventional detector technology, are often cost prohibitive in part because of the relatively high cost of radiation resistant detectors that can survive and operate in the hostile, radioactive environment.

Gamma-rays are biologically hazardous to mammals and other lifeforms, but may also damage electronics. Semiconductor electronics are affected by two basic radiation damage mechanisms, displacement damage and ionization damage. Few systems are immune to either phenomenon and most are sensitive to both. Ionization damage is mainly caused by gamma radiation and may be the primary type of damage experienced by electronics subjected to gamma radiation. Electronics may also be damaged by neutron and other ionizing radiation sources, and it is believed that some of the techniques described herein to provide a radiation monitoring system for monitoring gamma radiation dosage may also be useful to measure neutron and other ionizing radiation dosages.

Displacement damage can be understood to describe damage that is the result of incident radiation displacing silicon atoms from their normal lattice sites. The resulting defects alter the electronic characteristics of the crystal structure. Ionization damage can be understood to describe damage that is result of energy being absorbed by electronic ionization in insulating layers, which is predominantly $SiO_2$, and liberating charge carriers, which diffuse or drift to other locations where they are trapped, leading to unintended concentrations of charge and, as a consequence, parasitic fields.

Radiation damage to electronics is a complicated field, but is one consideration when designing sensor systems, including for example wireless sensor networks (WSN) applications to work in radiation environments.

If gamma radiation (or other ionizing radiation) suspected to be present in an area/environment, it is often desirable to determine the amount, or dose, of gamma radiation present within the area. For example, knowing the amount of gamma radiation present within a given target area may help determine if the area is safe for humans to enter.

A dose measurement system based on conventional technology could, in theory, achieve a relatively high-resolution discretization in space by employing large numbers of portable gaseous ionization detectors communicating over a wireless mesh network. Such systems utilize direct-sensing sensors (i.e. sensors that themselves measure the dosage of ionizing radiation) and may require the electronic circuits of the detectors and the radio nodes of the network to be adequately shielded from, or hardened against, radiation exposure over the entire time domain of an accident's radiological event sequence. For large scale accidents, the financial cost to implement such a system may be prohibitively high, as the per-unit cost of such direct, radiation-hardened sensors is relatively high.

As one alternative to existing systems using conventional direct-detecting detector/sensor technology and numerous, radiation hardened components, the inventors have developed a system for indirectly monitoring one or more environmental conditions (such as the presence of ionizing radiation), a method of using such a system and a communication protocol that may be used if the system is configured to include a wireless sensor network.

In one embodiment described herein, a new dose measurement system is described that incorporates at least one, and preferably a plurality of substantially unshielded, consumable nodes that are intentionally configured to be dam aged, and ultimately rendered inoperable as a result of their exposure to ionizing radiation (such as gamma radiation). The consumable nodes may be distributed within a chosen target area (i.e. the region in which measurement of radiation dosage is desired) before or after a radiological event occurs. For example, the system may be deployed around a nuclear power plant that is operating normally to help detect the occurrence of an unexpected radiation leak. Alternatively, the system may be deployed into a target area that is thought or known to have been irradiated, such as the area surrounding a damaged nuclear power plant, nuclear fuel spill, etc. to help measure the extent of the contamination and optionally to help map the radiation dosage levels within the target area (i.e. to find regions of relatively high and/or relatively low radiation dosage within the target area).

While the examples described in the most detail herein relate to the presence of ionizing radiation as the environmental condition, the teachings are not limited to such examples, and analogous systems may be deployed for indirectly monitoring a plurality of different environmental conditions (for example by modifying the characteristics of the system nodes as required).

Rather than using conventional detectors to directly measure radiation dosage, the proposed system can monitor the condition of the consumable nodes over time while they are exposed to the ionizing radiation (optionally individually and/or in relation to the condition of other of the consumable nodes). Measurable changes in the condition of the consumable nodes can then correlated to the dosage of ionizing radiation received by each node. For example, the system may detect the condition of a node at a first time and then detect the condition of a node at a second, later time. By comparing the change in the condition of the node the system can determine how much damage has occurred. The amount of damage can then be correlated with the amount of radiation exposure (i.e. the radiation dosage). Detecting the condition of the nodes can be conducted at any suitable frequency/interval.

Optionally, the consumable nodes may be generally single use elements and may have useful lifetimes that are substantially shorter than the duration of a given radiological event. If further monitoring is desired after the initial set of consumable nodes have been rendered inoperable, additional consumable nodes may be deployed into the target area. This second set of consumable nodes may communicate with each other, any of the remaining original consumable nodes as well as any resilient nodes or other members in the system.

Optionally, in some embodiments the monitoring system may include a heterogeneous set of nodes. For example, the nodes in a given embodiment of the system may be a heterogeneous combination of consumable nodes and resilient nodes that are more resistant to the environmental factors that can damage the consumable nodes. In some instances the resilient nodes may be shielded or otherwise configured, and may be more expensive than the consumable nodes. To help balance system performance and cost, a given system may include a relatively large number of consumable nodes intermixed with a relatively smaller number of resilient nodes. Optionally, the number of consumable nodes may be between 1.5 and 100 times the number of resilient nodes, or more.

For example, if the system is configured to operate in a radioactive target area, a large number of consumable nodes may be intermixed with a relatively smaller number of radiation-hardened, resilient nodes. The radiation-hardened nodes may be more resistant to the ionizing radiation and may remain operational longer than the unshielded consumable nodes in the target area, and fail at different times. This may help extend the useful life of the system by extending the dosage monitoring time. In most instances, the radiation-hardened nodes will be more expensive than the consumable nodes. By using a combination of both node types, with more consumable nodes than radiation-hardened nodes, the system may provide desirable monitoring capabilities while still having an acceptable average cost per node. For example, even in embodiments that employ a mixture of resilient and consumable nodes, the average cost per node may be approximately 2-3 orders of magnitude lower than the average cost per node in conventional systems that utilize portable gaseous ionization detectors communicating over a comparable wireless mesh network.

The consumable nodes may include any suitable components that are susceptible to damage from a given type of ionizing radiation that is to be measured (or to any other known environmental factor), and optionally can include onboard power supplies, communication ports and the like. In some embodiments, substantially the entire consumable node may be unshielded, such that all of its components are exposed to the ionizing radiation at the same rate. Alternatively, some portions of the consumable nodes may be provided with a relatively small amount of radiation shielding, such that they are exposed to the ionizing radiation at a different rate than the unshielded portions. Such minor shielding may be used to help protect relatively vulnerable components, so that substantially all of the components in the consumable node may fail in unison. Alternatively, the shielding may be used to help protect a sub-set of the components to help the shielded components survive longer than the unshielded components. For example, shielding may be used to help protect the power supply and communication ports so that these components remain operable while other components of the consumable node are being degraded. This may help increase the likelihood that the state of the consumable node continues to be reported to the rest of the system as its unshielded components degrade, rather than merely falling out of communication with the rest of the system.

The consumable nodes may be communicably linked to each other, and to other system components (such as a controller and the like) using any suitable wired and/or wireless communication mechanism, including electrical conductors, wires, fiber optic connections, radio waves, wi-fi, Bluetooth, infrared transmission and the like. Preferably, the system components may communicate with each other wirelessly. This may help simplify deployment and set-up of the system. This may also help facilitate placement of the consumable nodes in a variety of different locations in the target area without being limited by physical wires or the like extending between nodes. This may also help facilitate a relatively fast installation of the consumable nodes within the target area, which may help reduce the radiation exposure for the users and/or equipment used to disburse the nodes. Optionally, the consumable nodes may be remotely disbursed within the target area. For example, if the target area is a relatively large outdoor area surrounding a nuclear facility, a plurality of consumable nodes may be air-dropped into the area (for example from an airplane or drone) or otherwise launched into the area (possibly using a ground-based launcher).

In some embodiments, the consumable nodes may be generally randomly distributed within the target area (for example as the rest of an air-drop or the like). Alternatively, the consumable nodes may be positioned at specific, predetermined locations within the target area.

Optionally, the system may include at least one mechanism for determining the position, or approximate position, of some or all of the nodes (consumable or otherwise) used in the system. This may help the system create a profile or map of the radiation distribution within the target area by, for example, correlating the radiation dosage information for a given consumable node with its location information. Optionally, some or all of the nodes may include a position sensor, such as a GPS module or the like, that can measure the location of the node and transmit the data to other system components. Alternatively, in other embodiments, the system may utilize any suitable localization algorithm to derive the location of some or all of the nodes. This may be desirable for a variety of reasons, including cost, power consumption, and GPS inaccessibility within the target zone.

The ionizing radiation that is to be measured using the system may be any radiation that produces a sufficiently predictable, observable failure of the consumable nodes. One example of such radiation is gamma radiation, and several of the experiments described herein have been conducted using gamma radiation. Other types of radiation that may be suitable for measurement using the systems described herein may include x-ray, alpha radiation, beta radiation and the like.

Referring to FIG. 1, one embodiment of a radiation monitoring system 100 includes a base station 102 and a plurality of consumable nodes 104 distributed within a target area 106. The base station 102 can be used to facilitate communication between the nodes 104 and a data receiving unit (such as a computer, storage device, etc.). The data receiving unit may be a physically separate/remote device (such as a computer in a remote monitoring location, etc.) or may form part of the base station 102, as shown in the illustrated embodiments. The perimeter if the target area 106 is defined by a boundary, which is shown in dashed lines in the illustrated example. The boundary may coincide with physical boundaries such as walls, fences and the like, or may be an intangible boundary (i.e. not tied to a specific physical feature in the environment) such as the location where the ionizing radiation is not present and/or where its concentration is within acceptable limits. If the base station 102 is outside the target area 106, communications between the base station 102 and other system components may cross the boundary separating the target area 106 from the surrounding environment.

Figure 3:
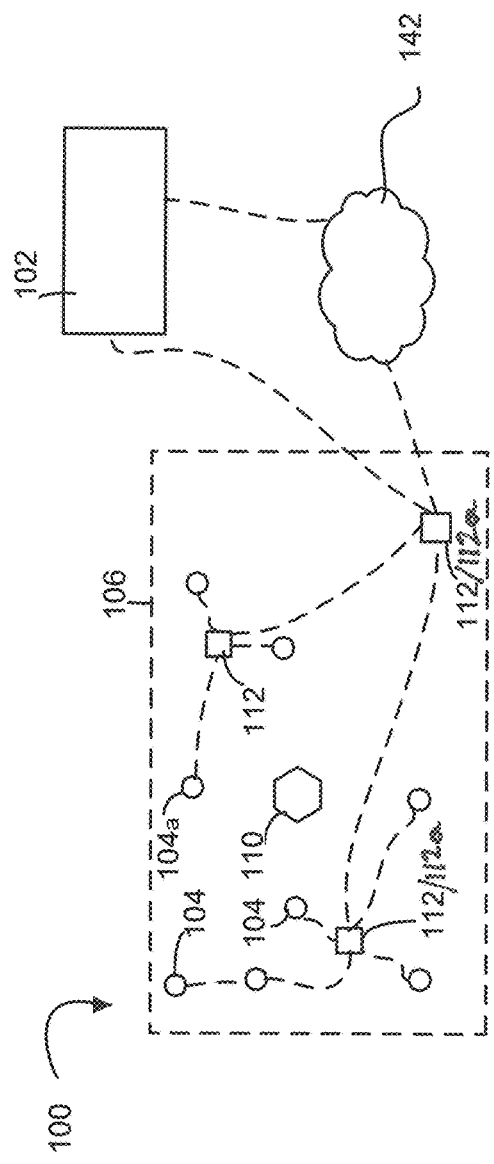
FIG. 3 is a schematic representation of another example of an indirect monitoring system.
Figure 4:
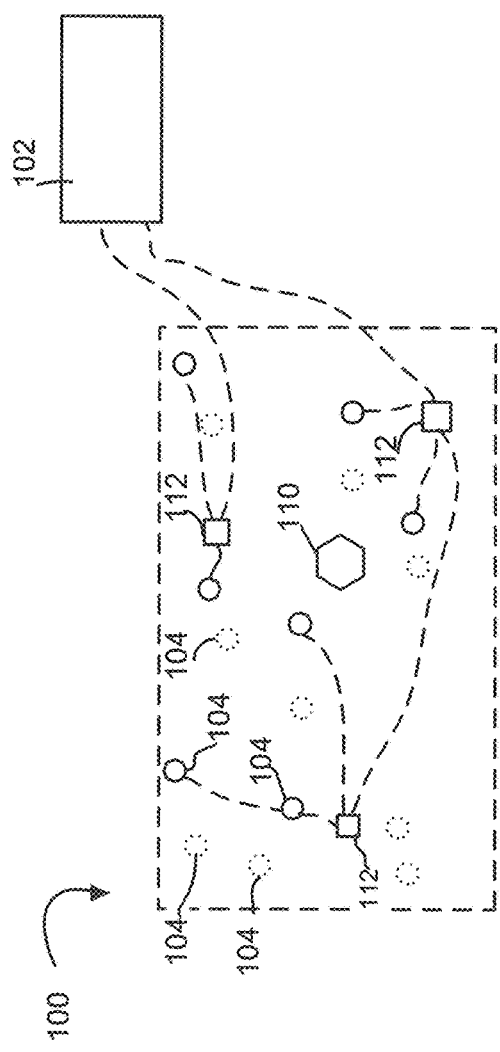
FIG. 4 is a schematic representation of the monitoring system of FIG. 3 with a second set of consumable nodes deployed.

In this embodiment, the consumable nodes 104 are communicably linked to the base station 102 using wires 108, which optionally may also provide power to the consumable nodes 104. Alternatively, as shown in the embodiment of FIGS. 2-4, the consumable nodes 104 (and any other nodes in the system 100) may be in wireless communication with the base station 102 and/or other ones of the consumable nodes 104. Wireless consumable nodes 104 may include any suitable power supply and communication apparatus (such as a transceiver). Such wireless communication is described in further detail herein.

Unlike conventional monitoring systems, the consumable nodes 104 in the systems 100 are not configured to directly sense or detect the environmental factor that the system 100 is being deployed to monitor. That is, in the present examples, the consumable nodes 104 are not themselves radiation sensing devices, and are not operable to directly detect a dosage gamma radiation (or other ionizing radiation). Instead, the system 100 can be used to indirectly monitor the presence/dosage of the ionizing radiation within the target area 106 by monitoring selected attributes/properties of the consumable nodes 104 and co-relating any changes to the selected attributes/properties over time (that are a result of exposure to the ionizing radiation) to the accumulated dosage of ionizing radiation that a given consumable node 104 has received.

For example, the consumable nodes 104 may include any suitable type of electronic components that can be in communication with the base station 102. The electronic components need not be provided with any material radiation shielding, and when subjected to ionizing radiation, the behavior and/or performance of the electronic components will change in a manner that can be detected/observed by the base station 102. Specifically, while the system 100 is used to monitor the target area 106, the electronic components in the consumable nodes 104 will become damaged by the ionizing radiation within the target area 106 over time, and their condition is likely to degrade and may, in some circumstances, degrade to the point where the consumable nodes 104 become inoperable and can no longer communicate with the base station 102. The length of time it takes for the consumable nodes 104 to be consumed (i.e. for the electronics to become inoperable) may be relatively short, and may be less than one day, less than two days, less than one week, less than two weeks, less than a month and other such times. In contrast, overall measurement time during which the target area 106 is monitored may be several days, weeks, months and optionally years. In some relatively high-dose environments, the consumable nodes 104 may be consumed in less than eight hours, and maybe less than two hours.

In the disclosed systems, the consumable nodes 104 can be considered effectively one-time use devices. Some portions of the nodes, such as a frame and/or housing, could possibly reusable, but the active portions of the consumable nodes 104 (i.e. the parts whose condition is monitored while the system is in use) are typically destroyed by exposure to the ionizing radiation and are not reusable.

The target area 106 can be any area where a user wishes to monitor the dosage of ionizing radiation. Optionally, the source of the ionizing radiation, such as a source 110, may be within the target area 106. Alternatively, the target area 106 need not include the source of the ionizing radiation. While illustrated as a rectangle for simplicity, the boundary of the target area 106 may be any suitable shape, and need not be limited to geometric shapes.

In the embodiment of FIG. 1 (and in the embodiments of FIGS. 2-4 and the simulation data in FIGS. 26-28) the consumable nodes 104 are randomly distributed within the target area 106. This may be suitable in a number of different circumstances, including if the consumable nodes 104 are dropped from an airplane or otherwise remotely deployed. This may help avoid the need for a user to enter the target area 106 to deploy the consumable nodes 104. This may be advantageous if the target area 106 is radioactive before the consumable nodes 104 are deployed.

Alternatively, the consumable nodes 104 may be arranged in a pre-determined pattern, such as a grid, spiral and the like, within the target area 106. This may be a desirable deployment strategy if the consumable nodes 104 are deployed in the target area 106 before it becomes radioactive, such as in instances where the consumable nodes 104 are used to monitor unplanned releases/leakage of radioactive material from power plants, fuel storage, etc.

Optionally, as illustrated in FIGS. 1 and 2, the system 100 may be a homogeneous system, in which all of the nodes are consumable nodes 104. This system may be inexpensive, and relatively easy to deploy as all of the nodes may be generally fungible. Optionally all of the consumable nodes 104 may be within direct communication range of the base station 102.

However, in some circumstances, a homogeneous system may have some drawbacks. For example, in the system shown in FIG. 2, some of the consumable nodes 104, such as those on the far left of the target area 106, may be too far away to directly, wireless communicate with the base station 102. In such instances, some of the farther consumable nodes 104 may be indirectly linked to the base station 102 by other ones of the consumable nodes 104, such that the signal travels in two or more discrete hops. Alternatively, while direct wireless communication may be possible, it may be undesirable as it may require relatively higher power output from each of the consumable nodes 104, whereas the multi-hop configuration may allow each consumable node 104 to operate at a lower power level (which may help increase the operating time of the nodes).

In such a configuration, the failure of some of the nodes in the communication chain, such as the consumable node 104a that is closes to the radiation source 110, may create a gap/break in the communication chain. For example, if the intensity of the radiation within the target area 106 is not uniform, it is possible that consumable node 104a may fail sooner than other consumable nodes 104 that are in less radioactive areas. This may result in communication with some of the other consumable nodes 104, for example those that upstream from the consumable node 104a (i.e. to the left as illustrated), being interrupted while the consumable nodes 104 are still active. This may result in some of the consumable node 104 being orphaned within the target area 106, and the data from such nodes no longer being available for monitoring purposes.

To help reduce the chances of such interruptions/orphaned nodes, the system 100 may include some type of relatively more robust communication chain or backbone that extends within the target area 106. The communication backbone can be a physical connection or wireless connection points that provide communication coverage over some or all of the target area 106, such that a consumable node 104 need only communicate with the closest portion of the communication backbone, rather than connecting directly to the base station 102. The communication backbone preferably has a longer life expectancy in the target area 106 than the consumable nodes 104, and may utilize and suitable hardware and communication routing protocols.

One example of a system that includes an embodiment of a communication backbone is the illustrated in FIGS. 3 and 4. In this embodiment, the monitoring system 100 is a heterogeneous system that includes at least two different types of nodes. The system 100 may include more than two different types of nodes (optionally having different properties), but only two types of nodes are illustrated in this example. Specifically, the system 100 includes a plurality of consumable nodes 104 and a plurality of resilient nodes 112.

As described herein, resilient nodes is understood to mean nodes that have received some degree of minimal radiation shielding so that they survive relatively longer than the unshielded, consumable nodes 104 but are not as radiation-hardened or costly as conventional, radiation-hardened sensors. The resilient nodes 112 are still understood to be one-time use nodes that are rendered inoperable by their exposure to the ionizing radiation.

Optionally, embodiments of the system may also include radiation-resistant nodes, which can survive longer than both the consumable nodes 104 and the resilient nodes 112. In some systems, the radiation-resistant nodes may have significant radiation shielding and may have lifetimes and resistance that is similar to conventional radiation-hardened sensors. Such radiation-resistant nodes may be used in combination with consumable nodes 104, resilient nodes 112 and/or a combination of both node types (i.e. to provide a system with three different node types). Such radiation-resistant nodes may be used to improve the lifespan of some aspects of the system, and in some embodiments it may be desirable to use one or more such nodes, despite the relatively higher costs.

When using both consumable nodes 104 and resilient nodes 112 (or radiation-resistant nodes 112a), the integrity of the communication chain(s) within the target area 106 may be improved. For example, the resilient nodes 112 maybe be communicably linked to each other to form a communication backbone that connects to the base station 102. The plurality of consumable nodes 104 may be communicably linked to the resilient nodes 112, directly or indirectly via another one of the consumable nodes 104, such that consumable nodes 104 that are far from the base station 102 can be linked to the base station 102 via the chain of resilient nodes.

With the system 100 configured as shown in FIG. 3, the failure of consumable node 104a does not result in additional consumable nodes 104 (to the left as illustrated) being orphaned. This may help improve the overall reliability, usability of the system 100 and may help ensure that relevant data is received from each consumable node 104, even if others of the consumable nodes 104 have failed. Optionally, as illustrated in FIG. 3, radiation-resistant nodes 112a may be used in addition to, or as an alternative to the resilient nodes 112 in the system 100. While resilient nodes 112 are described in some of the examples of the systems described herein, radiation-resistant nodes 112a may be substituted for some or all of the resilient nodes 112, or added in addition to the resilient nodes 112, if desired in any of the described systems.

Eventually, the resilient nodes 112 will also fail. However, the resilient nodes 112 may be configured so that their expected life span in the target area 106 is at least 1.5 times the lifespan of the consumable nodes 104, and optionally may be at least 2, 3, 4, 5, 6, 10, 20, 50 or 100 times greater than the lifespan "L" of the consumable nodes 104 (i.e. the lifespan of the resilient nodes 112 may be at least 2 L). This may help reduce the implementation cost of the system 100, by reducing the number of resilient nodes 112 that need to be deployed over the total time period the monitoring system 100 is in use.

Optionally, when the first set of consumable nodes 104 that are introduced into the target area 106 have failed, the system 100 may be augmented by adding a second, and subsequent, set of consumable nodes 104 into the target area 106. For example, as illustrated in FIG. 4, a fresh set of consumable nodes 104 (shown in solid lines) can be added to the system 100 after the first set of consumable nodes 104 have been destroyed (as shown using dashed lines). This may help facilitate the use of a common base station 102 with multiple different sets of consumable nodes 104, and may help allow the system 100 to be used to monitor the target area 106 for a time period that is longer than the life of any given consumable node 104. This may be done when using a homogeneous system comprising only consumable nodes 104 (FIGS. 1 and 2) and/or when using a heterogeneous system as shown in FIGS. 3 and 4.

Optionally, when using a heterogeneous system configuration, the same set of resilient nodes 112 may be used in combination with two or more sets of consumable nodes 104. For example, the same resilient nodes 112 that are used with the first set of consumable nodes 104 (FIG. 3) are also used with the second set of consumable nodes 104 introduced in FIG. 4. Using this approach, the resilient nodes 112 can be replaced at a different, preferably lower, frequency than the consumable nodes 104. Optionally, the resilient nodes 112 may not need to be replaced during the life time of the system 100. Optionally, the resolution of the system (i.e. as considered as the number of nodes per unit area) can be relatively high by using a relatively large number of consumable nodes 104, while at the same time using a much smaller number of (probably relatively more expensive) resilient nodes 112 to help provide a robust communication backbone.

Due to the higher degree of shielding, the radiation-resistant nodes 112a may receive less damage than the consumable nodes 104 and resilient nodes 112 in the system 100. In some deployments, the radiation-resistant nodes 112a may not be materially damaged by exposure to the ionizing radiation. In such instances, the radiation-resistant nodes 112a may not be used to calculate radiation dosage, but may function primarily as communication nodes to help provide a desired communication link with the consumable nodes 104 and/or resilient nodes 112 in the system. Optionally, in some embodiments of the system 100 the radiation-resistant nodes 112a may be configured as conventional, direct-detecting detector/sensors that are operable to sense the dosage of ionizing radiation without undergoing the same type of damage that is observed in the consumable nodes 104 and resilient nodes 112. In such instances, a system 100 may include a mixture of direct-sensing nodes (i.e. an embodiment of the radiation-resistant nodes 112a) and indirect sensing nodes (i.e. the consumable nodes 104 and/or resilient nodes 112). This combination of direct and indirect sensing nodes can optionally be used in combination with any of the systems 100 described herein.

Consumable Node

The consumable nodes 104 used in association with the system 100 may be any suitable type of hardware that is vulnerable to the ionizing radiation, and which can communicate its condition back to the base station 102. Preferably, the consumable nodes 104 need not be capable of directly monitoring the ionizing radiation, but possibly could be configured as direct-sensing apparatuses in some embodiments. Optionally, the consumable nodes 104 may be configured to sense other attributes of the target area 106, such as temperature, wind speed, and the like, and to relay this data back to the base station 102, in addition to the information about the condition of the consumable node 104 itself.

Optionally, the consumable nodes 104 can include onboard electronics that are vulnerable to the ionizing radiation. While a variety of different types of electronics may be used, using solid state electronics may be advantageous in some instances. For example, solid state electronics may require relatively less power to operate than some other types of electronics, which may help improve the operable lifetime of the consumable nodes.

Optionally, the components of the consumable nodes 104 may be positioned within any suitable housing. The housing may be configured to help protect the electronic components from physical damage and may optionally be generally sealed to help prevent water, dirt and the like from getting inside the housing. Contamination from water or dirt may cause the consumable nodes 104 to fail pre-maturely (i.e. prior to being rendered in operable due to exposure to the ionizing ration), which may impact the effectiveness of the system 100. The housing need not be configured to provide any meaningful radiation shielding, or otherwise inhibit the ingress of ionizing radiation into the interior of the consumable nodes 104.

The housing may be formed from any suitable material, including plastic, metal, composite materials and the like. The housing may have openable compartments to allow access to the interior of the consumable nodes 104.

Figure 5:
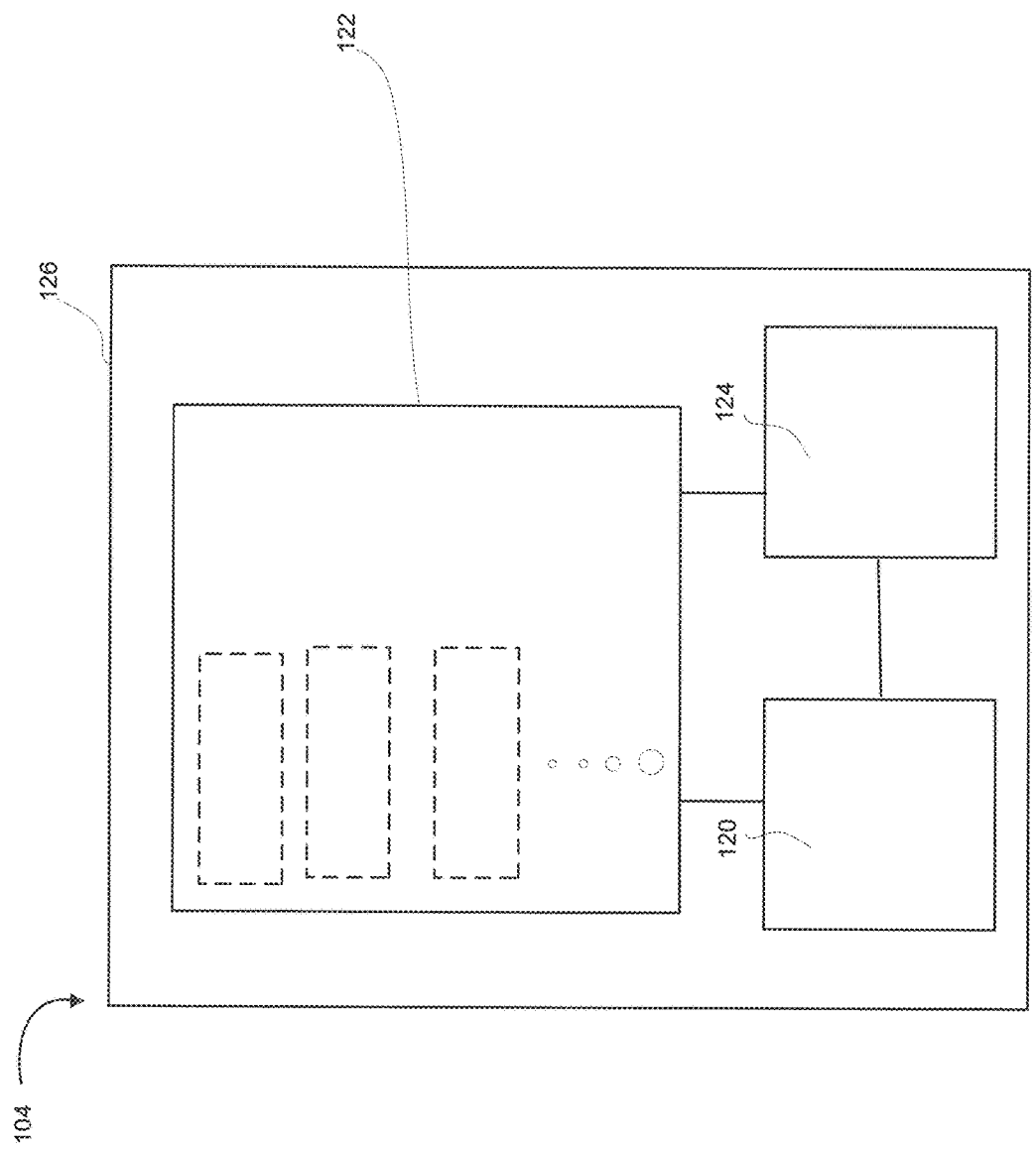
FIG. 5 is a schematic representation of one example of a consumable node that is usable with the systems of FIGS. 1-4.

Referring to FIG. 5, one example of a consumable node 104 is schematically illustrated. In this example, the consumable node 104 includes a suitable communication module 120 to connect with the base station 102, a radiation-susceptible electronics module 122 and an onboard power supply 124, for example in the form of at least one battery. The electronics module 122 may contain any suitable sub-modules, as noted by the plurality of dashed boxes included in FIG. 5. A housing 126 houses the functional components (i.e. the transceiver 120, radiation-susceptible electronics module 122 and onboard power supply 124). While illustrated conceptually as different modules, the transceiver 120, radiation-susceptible electronics module 122 and/or onboard power supply 124 may be provided as a single, integrated unit or may be further subdivided.

The electronics module 122 may include any suitable electrical components, and preferably includes circuits and/or modules that may be degraded as a result of increasing radiation dose, and may eventually fail. Optionally, more than one electronics module 122 may be provided within the housing 126 of a single consumable node 104 (or node 112 described herein). For example, a consumable node 104 may include two or more electronics modules 122. This may help improve system resolution. Monitoring the degradation of two or more electronics modules 122 that are located within the same housing 126 may provide additional information about the target area 106, and optionally may be used to help check the integrity of the data collected by the system 100. This may also help reduce the cost of implementing the system 100, as a common housing 126, and optionally common transceiver 120 and/or common power supply 124 may be used in conjunction with the multiple electronics modules 122.

Figure 6:
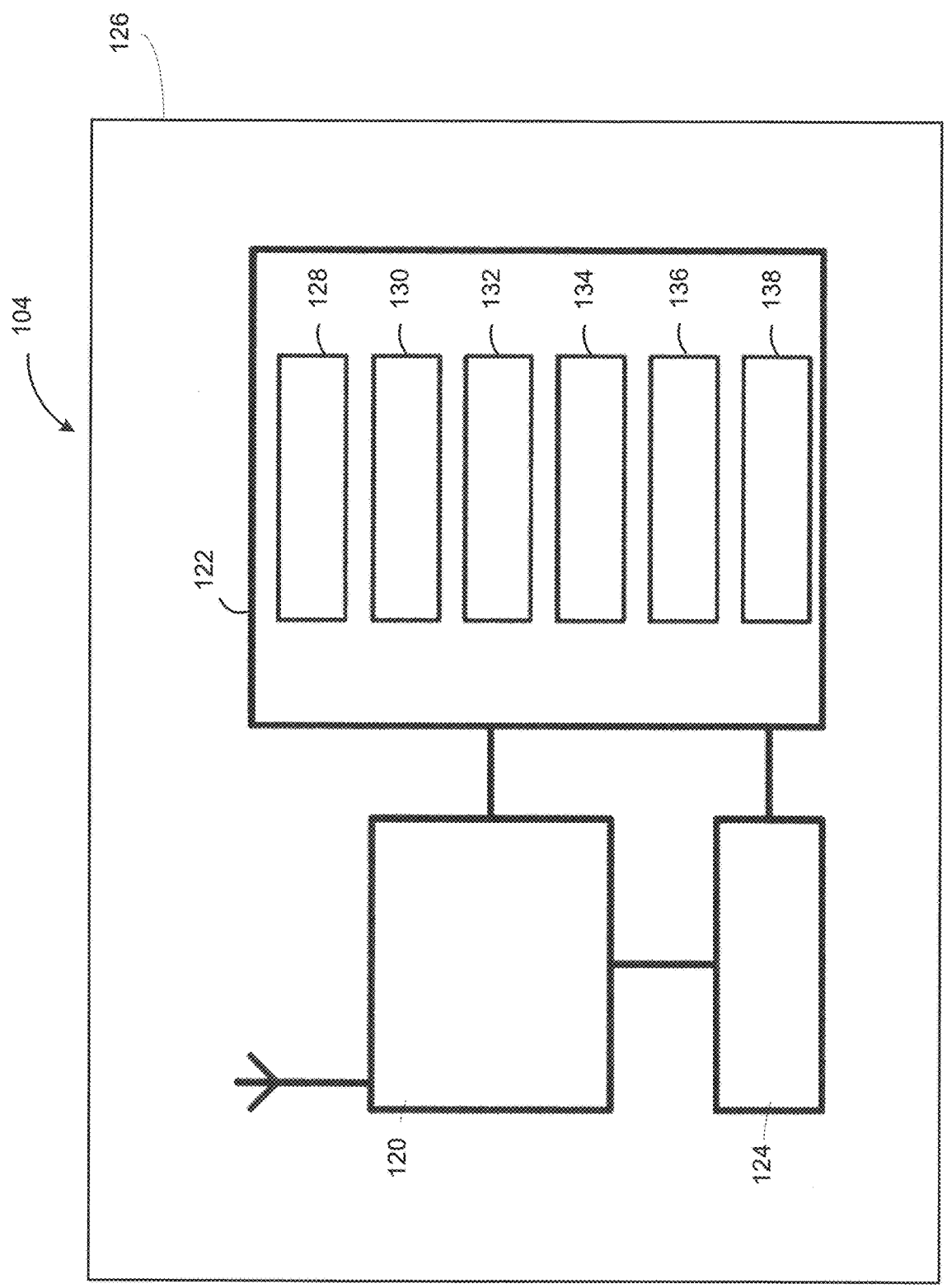
FIG. 6 is another schematic representation of another example of a consumable node that is usable with the systems of FIGS. 1-4.

Referring to FIG. 6, one example of a suitable consumable node 104 includes a power supply 124, a communication module in the form of a wireless transceiver 120 and an electronics module 122. The transceiver 120 may be used to communicate with a base station 102 or with other wireless nodes (either nodes 104 or 112) within the system 100.

The electronics module 122 may include any suitable components, and in this example includes a microprocessor 128, various types of storage memory including, but not limited to, SRAM 132, FLASH memory 134 and EEPROM 136. The consumable node 104 may also include other peripheral components, shown in peripheral modules 130 and 138, which may optionally include components (such as GPS modules and the like) for determining the location of the consumable node 104. The location of the consumable node 104 may be determined relative to the target area 106, location and/or proximity to the base station 102 or other nodes in the system, and the like.

During operation of the wireless consumable node 104, some radiation damage can be identified by the microcontroller 122 and reported, before consumable node 104 loses its ability to communicate. This may increase the possibility of a radiation damage being recorded/reported instead of being lost. Optionally, the microcontrollers 122 may be able to reprogram themselves while running. The reprogramming may utilize the generation of an internal high voltage (HV), which may rely on electronics with gates that are larger in size and thickness. The larger and the thicker a gate is, the generally more damage may be resulted from gamma ray total ionizing dose (TID) effect. Thus, the internal HV generation may usually be the first part to fail. Experiments conducted by the inventors suggest that the rest of the microcontroller functionality can last 3 times longer than the HV portion. A microcontroller can check if the HV is damaged by attempting to re-write unused areas of the flash memory associated with the HV component.

Experimental Testing of Radiation Dosage Measurement Based on Consumable Node Failure To help evaluate the performance of the proposed consumable nodes 104, and to further define the effect of ionizing radiation on the performance of integrated circuits that can be used in the electronics modules 122 of the consumable nodes 104, a series of gamma irradiation experiments were conducted on samples of two types of low-cost integrated circuits, under controlled conditions in a gamma cell at the Canadian Nuclear Laboratories (CNL) in Chalk River, Canada. The gamma radiation source used in the experiment was cobalt 60 (Co-60). In the experimental test, the dose rate of Co-60 was constant at $1.96 \times 10^2$ Gy h$^{-1}$, and the upper limit of exposure duration was 24 h. One observed effect was that the ionizing radiation induced cumulative deleterious changes, or damages, to the physical and electrical properties of the materials in the semiconductor integrated circuits. Some of the observed damage was in the form of changes in functional states of the integrated circuits that were not outcomes of programmed instructions—in other words, error events. Changes between functional states, or error events, were measured at regular intervals in real time by means of remote (wired) communication with the integrated circuit samples under irradiation. During the experiment the ICs under test were allowed to accumulate damages and error events over time and increasing dose to the point of total failure, beyond which no subsequent events were observed. Subsequent analyses of the error event sequences were performed to derive quantitative relationships between dose and error tallies for the integrated circuit types irradiated during the experiments.

Considerations in selection of integrated circuit types for irradiation experiments included relatively low unit cost and relative ease of programming for the purpose of measuring state changes. The two types chosen for experimentation were a microcontroller unit and electrically erasable programmable read-only memory (EEPROM) modules. However other types of integrated circuit components may similarly be used. The microcontrollers are generally understood to be small computers on a single chip with a processor (such as microcontroller 128), memory (such as SRAM and Flash modules 132 and 134), and peripherals for input and output (such as module 138). EEPROMS are generally known as non-volatile memory devices that can be programmed and erased by application of electrical signals from the circuits to which they are connected (such as module 136).

The tested samples consisted of 24 integrated circuits of identical manufacture, for each type. The sample of 24 microcontrollers was manufactured by Atmel in the 12th week of 2012, in the country of Taiwan, and had type designation Attiny13A-. The Attiny13A is a high performance, low power, 8 bit device, with 1 kB of ISP flash, 64-byte EEPROM, 64-byte SRAM, 32-byte register file, and 4-channel 10-bit analog-to-digital (A/D) converter. At 8 second intervals, each microcontroller was sent a signal to power up, self-check its state for errors indicative of radiation damage, and report the result.

The 24 EEPROMs tested were manufactured by ST Microelectronics in the 45th week of 2010, in the country of Malaysia, and had type designation M93C46WP. The M93C46WP is a serial access device of 1-Kbit capacity, operating within a voltage supply range from 2.5 V to 5.5 V. Its 1024 bit memory can be accessed by 8-bit byte or 16-bit word. It can be erased by byte, word, or by whole chip. At 3 second intervals, each EEPROM was sent a signal to power up, respond to a sequence of erase-write-and-read commands, and report the result. However, other sequences or combinations of commands may be applied to determine the operational state of these components.

Results returned from individual microcontrollers and EEPROMs were of integer type, with values representing a state of nominal functionality or one of several error states. For the purpose of analysis, the actual state at a given time was of less importance than the occurrence of a change from the previous state—for the reason that a state change infers incremental accumulation of damage, induced by a corresponding incremental accumulation of radiation dose.

Figure 8A:
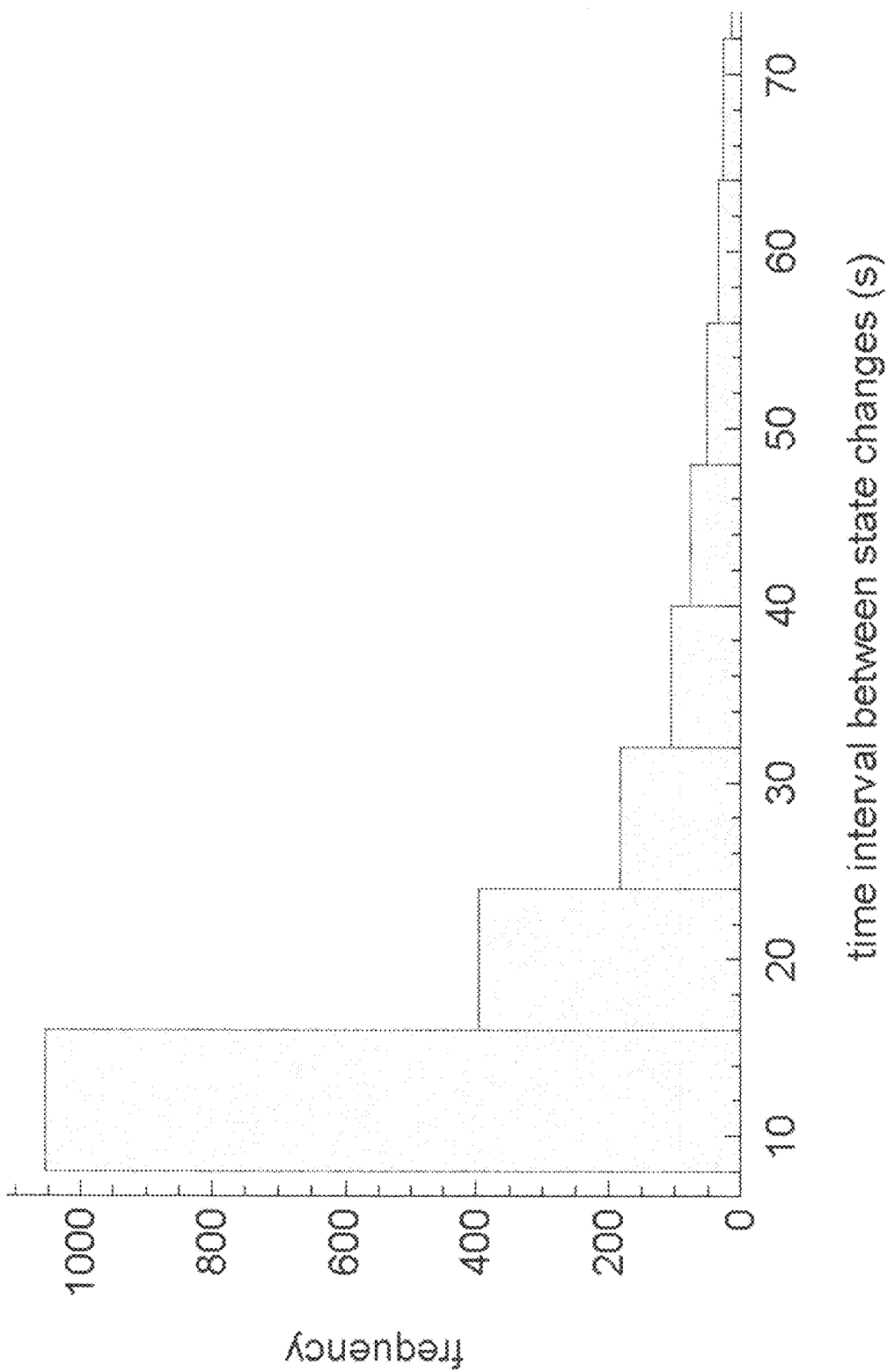
FIG. 8A is a histogram of calculated time intervals between successive state changes for 24 irradiated microcontrollers, corresponding to state measurements at 8 second intervals.
Figure 8B:
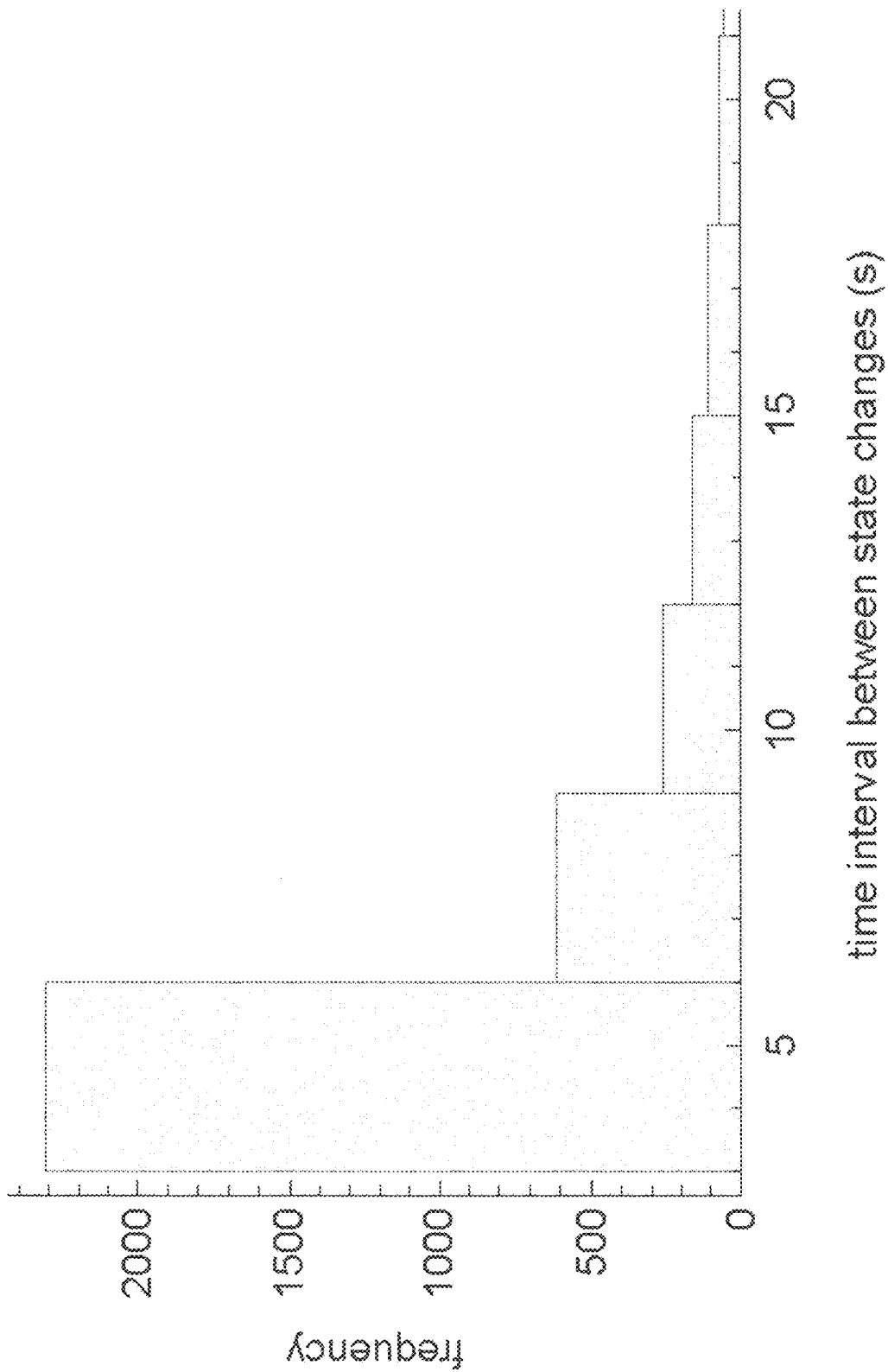
FIG. 8B is a histogram of calculated time intervals between successive state changes for 24 irradiated EEPROMs, corresponding to state measurements at 3 second intervals.

The temporal intervals between state measurements, 8 seconds for microcontrollers and 3 seconds for EEPROMs, were intended to be sufficiently short to resolve adequate numbers of state changes for statistical analysis, yet sufficiently long to minimize battery energy consumed by communication of the measured state changes via the WSN. Histograms of the calculated elapsed times between observed state changes, as shown in FIG. 8A and FIG. 8B, illustrate the effects of the selected temporal intervals on the elapsed-time distributions.

It was observed from the shapes of the histograms, which are prominently peaked at the lower limit of temporal resolution in each case, that greater numbers of state changes could be captured by using shorter intervals between state measurements, albeit at the expense of increased battery energy consumption for communication.

A comparison of measured occurrences of state changes or error events between individual integrated circuits revealed variation in number and dose ordinate. Among the 24 irradiated integrate circuits of each type, two examples are compared in FIG. 9 (microcontrollers) and FIG. 10 (EEPROMs).

Ordered by increasing value, the number of state changes recorded for each of the 24 microcontrollers and EEPROM are shown by the charts in FIGS. 11 and 12, respectively.

For this particular experiment, the total number of state changes measured was 2143 for microcontrollers, and 3874 for EEPROMS. FIGS. 11 and 12 may be used to show that there may be wider variance in the number of state changes for irradiated for microcontrollers as compared to EEPROMs. This observation may be confirmed by a comparison of order statistics (quartiles) for state changes in for microcontrollers and EEPROMs, listed in Table 1.

TABLE 1

| IC type | Min | Max | Interquartile Range | Lower Quartile | Median | Upper Quartile |
|---------|-----|-----|---------------------|----------------|--------|----------------|
| µC      | 4   | 347 | 103                 | 30             | 71     | 133            |
| EEPROM  | 58  | 231 | 55                  | 139            | 171    | 194            |

For the purpose of accurate statistical inference of dose from occurrences of error events in microcontrollers, it may be preferable that the responses of individual integrated circuits to dose be as consistent as possible. This may help improve the accuracy of the systems 100 described herein. From the data presented FIGS. 11 and 12, and Table 1, it was determined by the inventors that that EEPROMs may be superior to microcontrollers in that respect, and therefore the analyses presented subsequently considers data from the EEPROM experiment only.

Although EEPROMs may be generally more consistent in their responses to dose, Table 1 suggests that the interquartile range of error events is a significant fraction of the median value, approximately 1 part in 3. For an effective dose measurement system based on counts of error events in individual EEPROMs, this measure of consistency could be considered only marginally acceptable for some applications. As such, when selecting a WSN node for measuring gamma radiation with acceptable accuracy, a user may optionally choose to include a cluster of multiple EEPROMs (optionally within a single module, such as module 136) rather than a single EEPROM. In a cluster, it may be possible to average out the inconsistencies.

During the experiments, occurrences of state changes or error events were measured in units of elapsed time. Elapsed time was observed to be related to dose by the established rate constant of $1.96 \times 10^2$ Gy h$^{-1}$ and the point of origin given by coordinates {zero elapsed time, zero dose}. This relation can be used to help facilitate creation of an empirical distribution function [K] for each EEPROM. This may help provide a sufficiently accurate estimate of the cumulative distribution function (CDF) underlying the values of dose in the sample. It may be appreciated that the advantage conferred by the use of empirical distribution functions is that relatively little, and optionally no reliance is placed on weak or unsupported assumptions—in particular assumptions that the sample data comes from populations that follow probability distributions based on fixed sets of parameters. The corresponding CDFs of dose are shown in FIG. 13.

On dose scales ≥0.01 kGy (a single scale division on the dose axis of FIG. 13), individual EEPROMs may be shown to demonstrate piecewise response to dose, with major gaps appearing below 0.18 kGy and above 0.20 kGy. On dose scales <0.01 kGy however, they appear to respond in approximately linear fashion to dose over the interval between the gaps. A second plot of the CDFs is shown in FIG. 14, indicating the identified linear response interval, and with points of the discrete distributions joined by straight lines for easier visualization.

It may also be appreciated that because the data in the linear dose-response interval has the greatest practical value in developing a dose measurement system based on counts of error events in EEPROMs, only the dose data in that interval is considered in the analysis described beyond this point. The width of the interval may be sufficiently small (0.02 kGy=20 Gy) to warrant changing from units of kGy to Gy.

In some circumstances, it may be desirable that a practical dose measurement system (such as system 100) need not require the accumulation of a threshold dose in the field (i.e. when deployed in the target area 106) before effective dose measurements can take place, and preferably, the system would not include regions of low or zero response (gaps) to dose over its intended, practical measurement range. A system including such gaps could be usable, but may produce less desirable results than a system in which such gaps are reduced and/or eliminated.

During experimentation the inventors discovered that, for EEPROMs of the type evaluated, the threshold dose concerns could be eliminated in practice by pre-irradiating the EEPROMs to the dose at which the rate of occurrence of state changes with respect to dose becomes significant. That is, the EEPROMs, and optionally the nodes that are to be incorporated into, may be pre-irradiated to a desired threshold dose prior to be placed in the target area 106. This may help the system 100 to provide useful readings when first deployed. Optionally, the EEPROMs (or analogous component in other versions of the system) may be pre-irradiated prior to being incorporated with the rest of the node components. This may allow the EEPROMs to be pre-irradiated without having to also pre-irradiate the communication module 120, power supply 124 and/or other portions of the electronics module 122 in a given node.

In the EPPROMs tested, one suitable pre-irradiation does was found to be 180 Gy. For the purpose of analysis of the existing data, a corresponding virtual or simulated pre-irradiation of the 24 EEPROMs to 180 Gy may be achieved simply by excluding all dose values less than 180 Gy from the data, followed by subtraction of 180 Gy from the remaining values. These operations provided sets of experimentally based EEPROM dose data that were threshold free, gap free, and demonstrated a sufficiently linear response to dose on the interval 0-20 Gy to be useful for predictive purposes in the system 100. The corresponding CDFs of dose are shown (on the interval 0-20 Gy only) in FIG. 15.

The usefulness of such pre-irradiation is understood to be based on the assumption that associated damage to EEPROMs (or other analogous components) does not reverse over time in the absence of exposure to the ionizing radiation. That is, the assumption is one of the dependence of the occurrence of state changes on dose only and not directly on time, but only indirectly through the dependence of dose on time. There is evidence to support this assumption in an asymptotic case—for dose rates and corresponding doses near zero, EEPROMs (by design) do not normally experience unprogrammed state changes.

FIG. 16 shows a chart giving the number of state changes in each of the 24 irradiated EEPROMs, differing from FIG. 12 in accounting for exclusion of state changes attributable to simulated pre-irradiation to 180 Gy. In addition to the CDFs underlying FIG. 15, the total state changes shown in FIG. 16 may be required to map counts of state changes or error events to dose, as a means for realizing a practical dose measurement system.

The inventors have also discovered that a dose measurement system based on counts of error events in EEPROMs may be developed based on the mapping of error-tally values to dose values. By evaluating the inverse cumulative distribution functions of dose and scaling the probability values of the CDFs in the previous section by the total state changes or error events in individual EEPROMs, the requisite mappings can be derived. Such mappings for the 24 individual EEPROMs are shown in FIG. 17 below. Although the distributions are discrete, the points have been joined in FIG. 17, for ease of visualization.

From FIG. 17, it is evident that dose and error tally may be correlated quantities. Also suggested in FIG. 17 is that by 1) selecting a single EEPROM at random from the population represented by the sample; 2) exposing it to radiation; and 3) using the resulting error tallies to measure dose in accordance with the set of maps plotted in FIG. 17 may yield results of considerable variability. Statistical methods can be applied to better elucidate the evidence in each respect. The data underlying the error-tally-to-dose maps shown in FIG. 17 can be plotted as a smooth density histogram as shown in FIG. 18. Grayscaled regions varying in intensity from light to dark denote corresponding variations in map density from high to low. Dose quantiles calculated at discrete (integer) error tally values, and joined by lines for ease of visualization, show the median (unbroken), quartiles (dotted, 50% confidence limits), and ventiles (dashed, 90% confidence limits).

The median may be considered a robust estimate of the central tendency of dose. It preferential use over other estimates, such as the mean, in this analysis, may be justified by the nonnormality of dose distributions, at constant values of error tally. The nonnormality may be evident by asymmetry of distance in dose space, from the median to other matching quantile pairs, as observable in FIG. 18.

If the median dose shown in FIG. 18 were to be taken to represent the functional dependence of dose on error tally for individual EEPROMs, corresponding estimates of relative uncertainty based on confidence intervals may be significant. For example, the estimated relative uncertainty in dose values, based on a 90% confidence interval, could be as much as 1 part in 2 for doses ≥6 Gy, and even greater for doses <6 Gy. In the following section, one possible approach to reducing the relative uncertainty in measured dose values is described. The approach used may be one of tallying errors from multiple-EEPROM clusters.

A node (such as node 104 or node 112) for measuring radiation in a WSN may comprise of a single EEPROM or a cluster of multiple EEPROMs. An advantage of the latter configuration may be that it may be possible for variations in individual EEPROM responses to dose to be averaged out in the collective response of a cluster of EEPROMs. To explore the effects of clustering on reducing the estimated uncertainty of measured dose, inverse CDFs of dose for clusters of two sizes, 3 and 9 EEPROMs respectively, were evaluated and plotted in a somewhat similar manner to that described previously. A difference however, observed in the number of different virtual clusters that could be created from among the 24 EEPROMs, and for which inverse CDFs of dose could be calculated. Based on the number of different dose datasets from the sample of 24 EEPROMs, there would be $$\binom{24}{3} = 2024$$

possible unique cluster of 3 EEPROMs, and $$\binom{24}{9} = 1\,307\,504$$

possible unique cluster of 9 EEPROMs.

Prior to calculating an inverse CDF, dose datasets corresponding to the individual EEPROMs making up a virtual cluster were combined into a single dataset, representing the cluster's collective dose response. Probability values were scaled by the sum of corresponding state changes or error events for all EEPROMs in a cluster (simply equal to the number of collective dose values).

Inverse CDFs of dose were calculated for all 2024 possible unique clusters of 3 EEPROMs. Showing such a large number of inverse CDFs in a single plot, as was done for the 24 individual EEPROMs in FIG. 17, may be impractical, but showing the corresponding smooth density histogram and dose quantiles may be viable—see FIG. 19, below.

It was noted that inverse CDFs of dose for a smaller sample than all 2024 clusters of 3 EEPROMs could have been calculated, in an attempt to reduce the associated computational cost. Such a step may not be necessary in some circumstances, for example because a smaller sample also would likely have incurred an undesirable increase in randomness exhibited by the dose quantiles—consider that for a given discretely-distributed population, quantiles can be estimated with higher resolution from a large sample compared to that from a small sample.

It can be appreciated that it may not be practical to calculate the inverse CDFs of dose for all 1 307 504 possible unique clusters of 9 EEPROMs. Instead, 9 EEPROMs were randomly chosen from among the 24 EEPROMs to create one virtual cluster—and this process can be repeated until $2 \times 10^4$ such virtual clusters (of equal probability) were created. Again, a sample of maximum tractable size may be used, in order to minimize randomness exhibited by the dose quantiles. From the calculated corresponding $2 \times 10^4$ inverse CDFs, the smooth density histogram and dose quantiles are shown in FIG. 20*a*.

For any given value of median dose, a comparison of FIGS. 18, 19, and 20 shows that the corresponding scale parameter (width) of the distribution of dose may undergo a decrease with each successive increase in the number of EEPROMs involved in the measurement, in clusters of 1, 3, and 9, respectively. Tallying errors from multiple-EEPROM clusters may therefore be an effective approach to reducing the relative uncertainty in measured dose values at a WSN node.

For any given value of median dose, a comparison of FIGS. 18-20*a* shows that the corresponding scale parameter (i.e. width) of the distribution of dose undergoes a decrease with each successive increase in the number of EEPROMs involved in the measurement, in clusters of 1, 3 and 9 respectively. An estimate of relative uncertainty in measured dose can be obtained as the mean distance (parallel to the dose axis) from the median to the upper and lower 90% confidence limits, divided by the median. A comparison of corresponding estimates for 1 EEPROM, 3-EEPROM and 9-EEPROM clusters is shown in FIG. 20*b*.

A reduction in estimated relative uncertainty occurs in going from clusters of 3 to clusters of 9 EEPROMs. In the illustrated example, a reduction by a factor of almost 2 over most of the dose range 0-20 Gy is evident in FIG. 20*b*. Tallying errors from multiple EEPROM clusters may, in similar real world installations, be an effective approach to help reduce the relative uncertainty in measure dose values in the nodes (i.e. consumable nodes 104, resilient nodes 112 or radiation-resistant nodes 112*a*) in a system 100.

Implementation of one or more of the calculated relations between dose and error tallies in a practical WSN dose-measurement system, such as system 100, can be achieved. Tabulated pairs of correlated error-tally and dose-quantile values, obtainable from irradiation experiments on a suitable sample of EEPROMs or other integrated circuits, as described, can be stored on a base-station computer of a WSN, such as the base station 102. For any node (such as node 104 or nod 112) on the network, the base station 102 can tally errors communicated to it through the WSN. At a desired time, and optionally for one or more desired nodes 104/112, the base station 102 may determine the dosage of ionizing radiation received by the given node by reading from the tabulated pairs the dose quantile values corresponding to the current tally for the selected node(s).

Resilient Node

The resilient nodes 112 may include substantially the same components as the consumable nodes 104 and may function in substantially the same manner described herein, with the addition of some relatively minor radiation shielding to help preserve the communication abilities of the resilient nodes 112.

Figure 7:
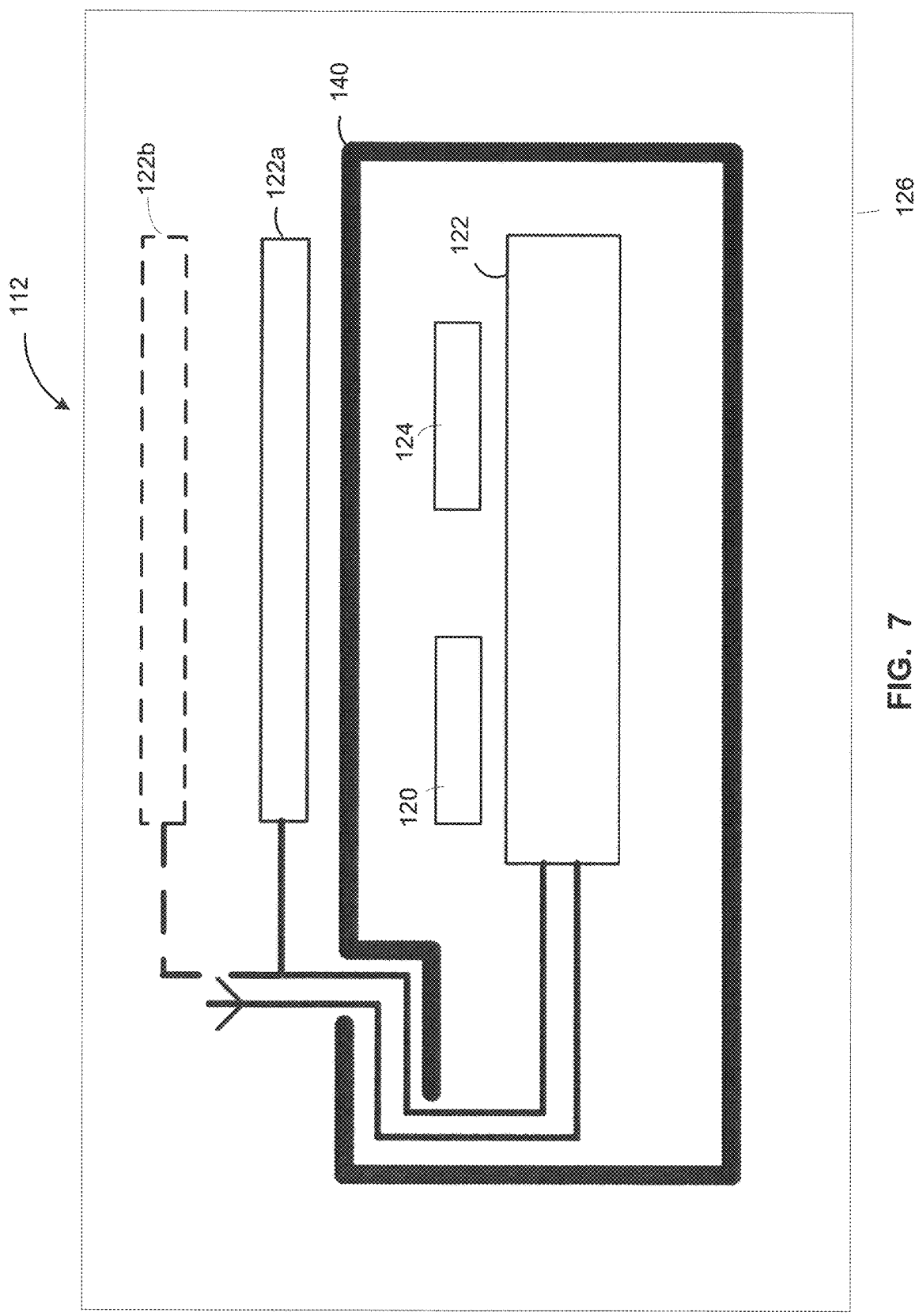
FIG. 7 is a schematic representation of one example of a resilient node that is usable with the systems of FIGS. 1-4.

Referring to FIG. 7, in one embodiment of a resilient node 112 the node may include an outer housing 126 that is analogous to the housing 126 on the consumable nodes 126, as well as a secondary housing 140, that may surround some of the internal components in the resilient node 112. While shown as being positioned within the housing 126, the secondary housing 140, may be outside the housing 126.

In this example, the secondary housing 140 includes some radiation-shielding materials and provides some degree of radiation shielding, and is positioned to protect the communication module 120, electronics module 122 and power supply 124. These components can co-operate to help facilitate communication between the resilient node 112 and any of the consumable nodes 104, other resilient nodes 112 and the base station 102. Optionally, some of the resilient nodes 112 may have this configuration and may function primarily as communication chain members.

Optionally, in addition to assisting with communication, the resilient nodes 112 may also include one or more sacrificial electronics modules 122 that are affected by the ionizing radiation in substantially the same manner as the consumable nodes 104. In the illustrated example, as shown in FIG. 7, a resilient node 112 includes a sacrificial electronics module 122a, and optionally additional sacrificial electronics modules 122b, that is outside the protective secondary housing 140. The sacrificial modules 122a, 122b, etc. are exposed to the ionizing radiation in the same manner as the consumable nodes 104 (i.e. to be exposed to the radiation so as to function as a damage indicator), and may be communicably linked to the primary electronics module 122 that is positioned within the secondary housing 140.

As noted herein, the radiation-shielded inner housing need not be configured to completely protect the electronics module 122, transceiver 120 and power supply 124 from radiation damage. Instead, the secondary housing may help such components to survive a little longer than the sacrificial modules 122a, 122b and the surrounding consumable nodes 104, for the purpose of passing along the information that is indicative of radiation damage, for itself and for the near-by nodes (112 and/or 104). Therefore, the shielding in the secondary housing 140 may not need to be bulky or prohibitively expensive, and the entire resilient node 112 may still be considered as single-use item.

Base Station

The base station 102 may be any suitable apparatus that can communicate with the plurality of nodes in the system 100, and optionally may also include an onboard computer, program logic controller (PLC) or the like to receive the data from the nodes and determine the radiation dosage that has been received by the nodes. For example, the base station 102 can be uploaded with the relevant concordance information to determine radiation dosage for each node, based on the observed performance and degradation of the node, as described in more detail herein.

Optionally, and sometimes preferably, the base station 102 may be positioned outside the target area 106, such as in the embodiments of FIGS. 1, 3 and 4. Positioning the base station 102 outside the target area 106 may reduce the likelihood that the base station 102, and any users in proximity to the base station 102, is harmed by the ionizing radiation. Alternatively, the base station 102 may be located within the target area 106, as shown using dashed lines in FIG. 2. Positioning the base station 102 closer to the consumable nodes 104 may help improve communication between the consumable nodes 104 and the base station 102 (in some embodiments of the system). This may also be a desirable configuration if the area surrounding the target area 106 is inaccessible or otherwise hostile. Optionally, the system 100 may include two or more base stations 102. For example, as shown in FIG. 2, the system 100 may include a base station 102 that is outside the target area 106, and an auxiliary base station 102 that is within the target area 106.

The base station 102 may be directly communicably linked to the nodes (optionally consumable nodes 104, resilient nodes 112 or a combination of both) as shown in FIGS. 1, 2 and 4. Alternatively, or in addition to a direct connection, the base station 102 may be linked to the nodes via one or more intermediary devices, networks and/or gateways, represent as cloud connection 142 in FIG. 3.

WSN Communication Protocol

The nodes used in the system 100 (such as nodes 104 and/or nodes 112) may communicate with each other and/or the base station 102 using any suitable mechanism. For example, the nodes may be hard-wired to each other and/or to the base station 102 (FIG. 1). The wires may provide data communication between the nodes and/or may provide electrical power. Alternatively, some or all of the nodes may be configured for wireless communication (FIGS. 2-4). This may eliminate the need for interconnecting wires, which may be useful if the nodes are to be distributed over a large target area. Such wireless nodes may include any suitable onboard power supply 124 (batteries, fuel cell, solar panel, wind turbine, etc.) to power the onboard electronics. Optionally, the plurality of nodes may be connected as part of a wireless sensor network.

Wireless Sensor Networks (WSNs) are used in many aspects of our daily life and can consist of a large number of sensor nodes that may optionally self-organize themselves into an inter-communicating wireless network that collects a desired type of information. A sensor node may be any suitable type of hardware/sensor, including the nodes 104 and 112 described herein. If the node in a wireless sensor network include an onboard power supply 124 (such as a battery), they may have a limited operational time (i.e. they can be operable until the power supply is depleted). It can be advantageous in some circumstances to try to extend the operational time of sensor nodes by using intelligent-designed, energy-conserving communication algorithms.

For example, in the fields of nuclear and space sciences, work has been done in the past decade for deploying traditional WSN based radiation-monitoring systems incorporating radiation-hardened, direct sensing sensors. Although nuclear and space monitoring are important WSN applications, both of them may be involved in high dose rate radiation environments. For example, WSNs were deployed in the area of the Fukushima Daiichi nuclear plant accident to monitor radiation levels. Extended-lifespan space structures, such as the International Space Station (ISS), are susceptible to micro-meteoroid and orbital debris damage, and NASA utilizes WSNs to detect leaks due to these kinds of damage. A known concern in nuclear and space applications is the high radiation environment. These applications are referred to as "radiation-sensitive applications". High doses of gamma-ray radiation cause cumulative damage to conventional WSN nodes, resulting in premature failure. Gamma-rays' damaging mechanisms are described as, and specifically linked to, electronic parameter changes in detectors, transistors and integrated circuits. Despite numerous advances in knowledge provided by previous work, the problem of prohibitive financial costs associated with high-resolution dose measurement systems using conventional detector technology has yet to be solved.

To help support the operation of the systems 100 described herein as a viable wireless network in such hostile environments, the inventors developed a new network communication protocol that may take advantage of the systems' heterogeneous configuration (i.e. a variant system 100 that employs relatively large numbers of unshielded consumable nodes 104, distributed amongst a smaller number of more resilient nodes 112).

Wireless Sensor Network localization algorithms may be divided into two categories, referred to as range-based and range-free. Typical range-based algorithms are characterized by Time Of Arrival (TOA), Time Difference Of Arrival (TDOA) location method, Received Signal Strength Indicator (RSSI), etc. Usually, range-based algorithms incur additional costs for extra hardware. On the other hand, the range-free approach locates non-anchor nodes by calculating their distances from a set of designated, but sparse, anchor nodes with known positions, also known as landmarks. Nuclear and space applications generally employ high-density networks with large numbers of nodes over large-scale areas, to help provide high-resolution data. To reduce cost, range-free methods are most commonly used. However, conventional methods were found not to be suitable for use in high radiation environments.

Wireless sensor networks may include a large number of nodes that may self-organize into a multi-hop wireless network to help collect and transmit information.

Over many years, the study of radiation effects in semiconductor electronics and the design of radiation-resistant integrated circuits produced the *nexus* of an active scientific community and a corresponding wealth of data and conceptual understanding of radiation damage to electronics. The general philosophy has focused around the principal objective of developing radiation-resistant electronics for space and nuclear communities. However, radiation-resistant devices present may impose significant costs to acquire, and may not be economical especially when the area being monitored is large. For example, Table 2 compares the specifications of typical conventional and radiation-resistant MIPS32 microcontroller (μCs) to its conventional counterpart. It may be appreciated that the ratio of unit prices is 1:500 between the conventional and the radiation-resistant counterpart. Moreover, while the μC may be considered the core part of a given WSN node, it may not always be the only core component. Specifically, to build a radiation-resistant node, other key electronic parts may also need to be made radiation-resistant in addition to the processor. Thus, the price gap between conventional and radiation-resistant components may be so great that it can become economically prohibitive to deploy a large number of radiation-resistant WSN nodes for large-scale sensing applications.

TABLE 2

| Specifications | Conventional μC | Radiation-resistant μC |
| --- | --- | --- |
| Clock speed | 400 MHz | 15 MHz |
| Pin numbers | 256 | 256 |
| On-chip data cache | 8 kB | 2 kB |
| On-chip instruction cache | 8 kB | 4 kB |
| UART number | Dual | Dual |

In contrast to such known systems, the inventors have developed an environmentally adaptive protocol stack for a WSN is presented which may be used to facilitate communication in a heterogeneous WSN comprising of both resilient and consumable nodes. The protocol stack descried herein may be used to help balance the cost and performance of the WSN in a large-scale gamma-ray radiation environment. It may also be used to deploy a WSN in other types of hostile environments of any size, and need not be limited to radiation-based scenarios. For example, such environments may include, but not limited to, environments of extreme temperature, chemical contaminants, or extreme pressure. When monitoring such environments, the system may be configured with a plurality of consumable nodes that will be destroyed by the environmental factors in a predictable manner (such as suffering performance degradation as a result of exposure to elevated temperatures or exposure to acid), as well as an optional plurality of resilient nodes that are slightly more resistant to the specific environmental factor (i.e. provided with slight thermal or acid resistant housings). The communication protocol developed herein may be used in combination with any such suitable network.

In the heterogeneous WSN used in the systems 100 described in the present case, the resilient nodes 112 may be used to establish a communication backbone, while the conventional or consumable nodes 104 may be used to extend the monitoring area as well as improve the data quality of the WSN. With respect to the protocol stack, the routing protocol may be an extended or modified from the LEACH (Low Energy Adaptive Clustering Hierarchy) routing protocol, and may be designated as LEACH-R (LEACH-Radiation). However it may be understood that in other embodiments, another protocol appropriate for WSN communication may be similarly adapted. In the present case the modification may include implementing an S-MAC (Sensor-MAC) protocol as the Media Access Control (MAC) layer to replace the standard MAC protocol used by the LEACH.

The inventors developed a failure probability density of individual WSN nodes caused by ionizing radiation damage is based on test results, obtained in a Gamma-220 facility (Co-60 source) at the Canadian Nuclear Laboratories (CNL) as described herein. To set up the experiments, a network simulator program, NS2, with LEACH were extended to support the simulation of radiation-dose dependent early failure of WSN nodes, and the resulting consequences to the performance of the WSN.

The WSN node used in to test the effects of ionizing radiation included a microcontroller (μC) and a number of associated passive components. This test was to demonstrate that the radiation hardness is determined primarily by μCs, and that passive components (like resistors and capacitors) are relatively immune to radiation damage. The radiation hardness of the alternative μC may be used as the estimated radiation hardness of the WSN nodes. For the particular test, twenty-four alternative μCs specifically programmed as Unit Under Test (UUT) were irradiated in a Gamma-220 facility at CNL. The μC used in the tests are ATtiny13A, manufactured by ATMEL, although any other suitable μC may similarly be used. Specifically, the ATtiny13A μC is a high performance, low power 8-bit Microcontroller. It features 1 KB of ISP Flash, 64-byte EEPROM, 64-byte SRAM, 32-Byte register file, and 4-channel 10-bit A/D converter [16]. The UUT may be programmed to continuously report its self-checking results to a monitor μC until the UUT eventually fails as a result of radiation damage. The framework of the radiation hardness test is shown in FIG. 21 'D'.

The radiation dose response of individual μCs may be characterized, as described earlier, by a discrete numerical state variable on a domain representing 3 possible states. The variable→state relation may be defined as 0→normal, 1→FLASH memory error, and 2→unresponsive (dead). In the experiment, the state variables were measured at intervals of 4 seconds, although this interval may be adjusted accordingly to suit the desired measurement resolution. For example, in some embodiments of the systems 100 described herein the interval between state measurements may be less than about 10 seconds, less than about 5 seconds, less than about 4 seconds, less than about 3 seconds and less than about 2 seconds. In some situations (for example low expected radiation exposure) the time interval may be longer than 10 seconds. In other situations, the time interval may be less than 2 seconds. The elapsed time of the constant-irradiation test was 24 hours, at a dose rate of 0.196 kGy/h provided by the gamma cell. The collected data suggests that, contrary to initial expectations, the state transitions of individual μCs may be reversible, for example as shown in FIG. 9 and FIG. 22. That is, a dead μC may revert to a normal working state, at least temporarily. The data further indicated that no state changes were recorded after 14 hours.

The elapsed-time values of state changes were transformed to absorbed-dose values. FIG. 23 shows a histogram of the absorbed-dose values, which resembles a Weibull distribution (C in Equation 1) with a shape parameter greater than unity, corresponding to a state-change rate that increased with dose. The parameters of the distribution may be evaluated using an automated computer program, for example, using the "FindDistributionParameters" function of the computational software program, Mathematica (within the function, the parameter estimator was set to "method of cumulants"). The shape parameter α and scale parameter β for this particular experiment were estimated to be 5.40347 and 1.57327, respectively. FIG. 23 also shows the histogram of absorbed dose values on a probability density scale, along with the fitted Probability Density Function (PDF) for the Weibull distribution given below.

$$PDF(C)(d) = \alpha \left(\frac{1}{\beta}\right)^\alpha d^{\alpha-1} e^{\left(\frac{1}{\beta}\right)^\alpha (-d^\alpha)} \quad (1)$$

It may be noted that the data processing step does not explicitly model reversible state changes in μCs since they appear temporary. As such a simplifying assumption can be made that all state changes are of the type normal→unresponsive (dead) and are irreversible, following the Weibull distribution with the PDF shown in FIG. 23.

The data collected from the test described previously may be used to quantitatively determine the extent and duration of radiation damage to conventional WSN nodes, and thereby demonstrating why it may be desirable to use radiation-resistant WSN nodes for critical nuclear and space applications. It may be appreciated that conventional WSN nodes may not offer sufficiently reliable service in such applications. Nevertheless, it is also generally impractical to deploy a large number of radiation-resistant WSN nodes for large-scale applications because high cost of the radiation-resistant devices. For example, in the Fukushima Daiichi nuclear power plant accident, Japanese authorities implemented a 20 km exclusion zone around the power plant. To monitor such a large area by WSN, thousands of radiation-resistant WSN nodes would be required. Fulfilling such a requirement would be prohibitively expensive.

In this section, an affordable, environmentally adaptive protocol stack designed to support a heterogeneous WSN in a high gamma-ray radiation environment is presented. Specifically, a heterogeneous WSN comprising of both radiation-resistant and consumable nodes may be used to optimize cost and performance characteristics of practical WSN designs, so as to achieve economical measurements of variable gamma-ray radiation dose on large spatial and temporal scales.

In the non-radiation (or otherwise non-extreme) environments, investigating node placement in the context of homogeneous WSNs for a large-scale network have been studied. Less complexity and better manageability are may be regarded as generally the beneficial effects that motivate the use of homogenous WSNs. The different types of nodes to be used in the WSN can be deployed over an area being monitored in a random or deterministic fashion. For large areas, random deployment is generally the more popular strategy.

Deployment of WSN nodes may be accomplished from an airplane or drone. The popularity of this method of deployment may be attributed to the low cost of conventional WSN nodes, and the commensurate flexibility to both mitigate circumstances of inadequate coverage, and achieve high spatial resolution, by the simple expedient scattering of more nodes.

The distribution of WSN nodes may not always be uniform. To help address the cost issue for the radiation environment, a heterogeneous WSN and make use of a square grid deployment strategy to balance the cost and performance of the network. Specifically, in this heterogeneous WSN, radiation-resistant nodes 112 used build the backbone of communication may be deployed at specific locations making up a square grid, in which each grid point in the network hosts a resilient node 112. Meanwhile, the consumable nodes 104 may be deployed to extend the monitoring area to provide higher quality information in the region of interest, and these consumable nodes 104 can be deployed in a random fashion. During run-time of the system 100 using the WSN, the communication backbone of the network, i.e. the resilient nodes may experience lower risk of damage in the radiation environment and may therefore help provide a reasonable quality of information. During run-time of the system 100, if a significant number of consumable nodes 104 are damaged and the quality of data does not meet a pre-established measurement requirement, new consumable nodes 104 could be deployed randomly or strategically (i.e. target to replace destroyed nodes) to the target area 106 to compensate the performance loss.

Described in more detail herein is a protocol stack that may be used to support this large-scale heterogeneous network. In the protocol stack, a newly invented routing protocol (referred to as LEACH-R (LEACH-Radiation) for convenience but without limiting its application to radiation-induced node damage), may be implemented to extend or enhance the standard LEACH protocol. Optionally, S-MAC may be chosen as the MAC layer to replace the sensor-MAC used by standard LEACH.

The conventional LEACH protocol for WSNs generally combines the ideas of energy-efficient cluster-based routing and media access together with application-specific data aggregation to achieve good performance in terms of system lifetime, latency and application-perceived quality. Conventional LEACH can operate in two phases: setup phase and steady phase. In the setup phase, some nodes are chosen as the Cluster Heads (CHs) based on heuristics. The CH position can later be rotated amongst all of the nodes to better distribute the energy consumption across the population of suitable nodes. The more nodes that are rotated through the CH position, the greater the energy savings that may be achieved across the system.

During the steady phase, a CH may collect and aggregate the data from their members of the cluster and then forward the data to a receiver. In LEACH, the communication protocol for the intra-cluster communication is TDMA (Time Division Multiple Access) based to reduce conflicts within the clusters, and DS-SS (Direct-Sequence Spread Spectrum) is used by the cluster heads to avoid inter-cluster interference. LEACH supposes that only single-hop communication is needed in the cluster, and that all CHs are able to send the data to the BS directly. It should be noted that this assumption may create the possibility of conflict during the setup phase, as the maximum-range broadcasts of cluster head availability can conflict. The assumption is useful to avoid the hidden terminal problem, but is not true in many applications, particularly with low-power transmitters over larger areas. This two-hop routing is quite resistant to random disruption, especially as network size increases, isolating nodes relatively rarely. As such, the LEACH may be preferable over other known WSN communication protocols (e.g. LEACH-C, Stat-Clus, MTE, PEGASIS etc.) to better support a large-scale network, but is still lacking a suitable mechanism for dealing with the expected destruction of the consumable nodes 104 in the systems 100. In such systems, preserving the communication integrity of the system may take precedence over power savings, and may require a more selective utilization of the heterogeneous node types (104 and 112) than is provided for in the current LEACH protocol.

Specifically, the inventors have noted that conventional LEACH assumes only two hops are needed between a Cluster Member (CM) and BS. It should be noted that generally, WSN nodes are battery powered. Energy consumption in wireless systems is directly proportional to the square of the distance between a transmitter and a receiver. Thus, long distance single hop communication may be expensive in terms of energy consumption. As such, most commercial WSN nodes are generally of limited transmission range. For example, results of experiments conducted in the field indicate that the maximum transmission range is approximately 55 meters for a mica2 node and 135 meters for a mica2dot node, respectively. Consequently, scalability may be an issue in LEACH for large-scale applications, for example monitoring the 20 km exclusion zone around the Fukushima Daiichi nuclear power plant.

LEACH-R (LEACH-Radiation) is a newly developed protocol created by the inventors to support a large-scale heterogeneous network. Generally speaking, in LEACH-R, both inter-cluster and intra-cluster communication may operate in multi-hop fashion. To help improve system reliability, the inventors have determine that the role of CH ought to only be shared amongst the nodes with the longer expected life spans in the environment, rather than the consumable nodes in the system 100, in preferred embodiments, so as to establish a robust backbone of communication within a hostile environment. For example, in some systems the role of CH may be filled by resilient nodes 112, radiation-resistant nodes 112a, or other suitable nodes having a lifespan that is longer than the plurality of consumable nodes 104 and/or a combination thereof. Further, the chosen nodes with the longer expected life spans (for example nodes 112 or 112a or a combination thereof) may also be CMs when not selected as a CH. On the other hand, the consumable nodes 104 may only be operated as the CM in the preferred embodiments of the system 100 to further help improve the quality of information. Alternatively, if necessary, selected ones of the consumable nodes 104 could also be designated as possible CH candidates in select circumstances (such as a system 100 that does not include resilient nodes 112), but for the remaining discussion it is assumed that the role of CH is limited to the nodes with the longer expected life spans in most systems 100 that include such nodes. For the purposes of the simulations described herein, the nodes with the longer expected life spans can be understood to be examples of resilient nodes 112 that are assumed to have a life span that is longer than the simulated use of the system 100. That is, the resilient nodes 112 are assumed to survive for the duration of the simulation (and optionally in an analogous real world application), while the consumable nodes 104 fail as described herein. This assumption is useful in developing the communication protocol for the system 100, even if the resilient nodes 112 are likely to be damaged eventually. In other simulations, and/or in embodiments of the system 100, the resilient nodes 112 described below could be replaced with radiation-resistant nodes 112a or other suitable nodes with a desirable expected life span For clarity, it is noted that the simulations described below were intended to evaluate the wireless network performance, while the simulations described in relation to the performance of consumable nodes were intended to focus on the radiation dose mapping.

As the relatively expensive resilient nodes 112 (and/or radiation-resistant nodes) are the minority and the less expensive consumable nodes 104 are the majority in the system, the cost of building a large-scale nuclear and space WSN applications may be reduced as compared to conventional sensor systems. One example of hierarchical clustering WSN topology formed by LEACH-R is shown in FIG. 24.

Like LEACH, LEACH-R may also operate in two phases: a setup phase and a steady phase. In the setup phase, some of the nodes maybe chosen as the CH based on the heuristics in a similar or the same manner as LEACH, except that only the resilient nodes 112 may be considered as CH candidates in LEACH-R. The CH position may later be rotated among the resilient nodes 112 to better distribute the energy consumption. The radiation-resistant node that is no longer selected as the CHs can operate as the CMs with other consumable nodes 104.

In the steady phase, the CHs collect and aggregate the data from their members and then send the data to the base station 102. However, unlike LEACH, both intra-cluster and inter-cluster communications may operate in the multi-hop manner, enabling LEACH-R needs to operate on a large-scale network. FIG. 24 illustrates that communication between the base station 102 and CMs (consumable nodes 104) may be facilitated via the radiation-resistant CH (resilient node 112) in which data travel via multiple hops. For example data from a CM consumable node 104 may be transmitted to another CM consumable node 104 prior to reaching a CH resilient node 112. Similarly, data from CH resilient node 112 head may be first sent to another CH resilient node 112 prior to the data reaching the base station 102.

Optionally, the multi-hop routes of inter-cluster and intra-cluster communication may be built separately. To do so, the base station 102 may broadcast a base station advertisement message (BS-ADV) using a CSMA (Carrier-Sense Multiple Access) based MAC protocol such as S-MAC. BS-ADV can be relayed within the network to ensure that it could be received by every resilient node 112 (or other node) eligible to be a CH. In addition, the counter counting the number of hops in the BS-ADV can be incremented after each relay. The BS-ADV with a higher hop count may be discarded, to avoid loops, if a node has already received one BS-ADV with a lower hop count. The shortest route from any CH to the base station may be chosen using any suitable algorithm, such as the Dijkstra algorithm, which is based on the assumption that the distance between nodes are known. It may be appreciated that not only resilient nodes 112, but also consumable nodes 104 could operate as a relay node in the route, and the relay nodes could be a CH or CM. During operation, if a consumable node 104 in the route is damaged by gamma radiation, a new route with a longer distance may be built in the next round of setup phase. At the end, when all the consumable nodes 104 have been rendered inoperable, the route would only consist of resilient nodes 112. Optionally, as mentioned earlier, a second set of consumable nodes 104 could be deployed into the system 100 in a random fashion or some predetermined manner to re-establish the desired level of performance of the network at any time, as the cost of consumable nodes 104 may almost be substantially less than the cost of resilient nodes 112.

Meanwhile, the CHs may broadcast a CH Advertisement Message (CH-ADV) using the S-MAC protocol. Non-CH nodes would relay the CH-ADV within the network and send back a Join Request Message (JOIN-REQ) to the CHs to establish a cluster. Once a node joins a cluster, it would not join other clusters. Like inter-cluster communication, the shortest route within a cluster from any CM to the CH can be chosen by the Dijkstra algorithm. In addition, the CH can set up a TDMA schedule and transmits this schedule to member nodes in the cluster. The TDMA schedule may be used to avoid collisions among data messages during their transmit time. The spatial reuse of TDMA may be used in wireless multi-hop networks to achieve both high capacity and delay guarantees, since it would allow a given time slot simultaneously used radio units that are geographically separated, so that minimal interference is obtained. Some differences between the conventional LEACH and new LEACH-R are protocols are set out in Table 3.

TABLE 3

|  | LEACH | LEACH-R |
| --- | --- | --- |
| Type | Homogeneous | Heterogeneous |
| Cluster Head | Any Node | Radiation-resistant Nodes |
| Cluster Members | Any Node | Any Node |
| Relay Nodes | None | Any Node in Any Role |
| MAC | Sensor MAC | S-MAC |
| Inter-cluster Route | Single-hop | Multi-hop |
| Intra-cluster Route | Single-hop | Multi-hop |
| Inter-cluster Data Tx | DS-SS | CSMA |
| Intra-cluster Data Tx | TDMA | TDMA |

Optionally, the MAC communication layer may make use of the CSMA based S-MAC protocol, which is one of the first energy-efficient MAC protocols used in WSNs. S-MAC is designed to reduce energy consumption by introducing four major components: periodic listening, collision avoidance, overhearing avoidance, and message passing.

Periodic listen and sleep is the one component of S-MAC, which may help address the issue of energy waste due to idle listening. Each node may go to a sleep mode for a period of time, and then wake up and listen to see if any other node will communicate with it. During the sleep period, the node may turn off its radio, and set a timer to wake itself later. Normally, S-MAC synchronizes all the nodes to ensure that they can listen and sleep at the same time. Therefore, the nodes may periodically exchange synchronization packets to maintain their synchronization. Collision avoidance may be achieved by following similar procedures established in the IEEE 802.11 specification (Network Allocation Vector, Carrier Sense and RTS/CTS (Request to Send/Clear to Send) mechanism). Forcing interfering nodes to sleep after they "hear" a RTS/CTS packet can avoid overhearing efficiently. Finally, message passing may be introduced to reduce the control packet overhead. The approach aims to fragment a long message into small fragments, and transmit them in bursts, and only one RTS and one CTS packet are used. The work flow of S-MAC is illustrated in FIG. 25.

An evaluation of the LEARH-R protocol stack was implemented on a simulated WSN through network simulator NS2, to evaluate its data gathering capability. Specifically different proportions of resilient nodes 112 relative to the total number of nodes in the network were evaluated. For the evaluation proportions including 12.5% (called p0.125), 25% (called p0.25), 50% (called p0.5) and 100% (called p1.0) were considered. In addition, two node deployment strategies were evaluated. The first strategy is the random deployment of all nodes (including both consumable nodes 104 and resilient nodes 112), and the second strategy related to deploying at least some of the resilient nodes 112 on the square grid and then deploying remaining nodes, including both the consumable nodes 104 and additional resilient nodes 112, randomly amongst the grid points (called the hybrid strategy). The nodes were configured to be equipped with enough initial energy to ensure failure of a given node was not due to loss of power due to battery failure, so that the radiation damage was the cause of node failures during the simulated period.

First, FIG. 26 shows a diagram depicting the nodes location map of the locations of randomly deployed nodes. The simulation on this map covered the configurations of 12.5%, 25%, 50% and 100% nodes as radiation-resistant, resilient nodes 112. Second, in FIG. 27, 100 radiation-resistant, resilient nodes 112 were deployed in square grids (20 m separation between grid points), and other nodes (as mixture of 104 and 112) were randomly deployed. This network was used for the simulation of p0.125, p0.25, p0.5 and p1.0 configurations, in which nodes are deployed by the hybrid strategy. Third, in FIG. 28, 50 resilient nodes 112 were deployed at the square grids (40 m separation), and other nodes are still randomly deployed. This network was used for the simulation of 12.5% nodes as radiation-resistant nodes, in which nodes are deployed by the hybrid strategy.

The simulated WSN was assumed to operate in a gamma radiation field of spatially-varying intensity, resulting in radiation-damage-induced failure of nodes over time. The probability density of failure of an individual node was modelled on a Weibull distribution, for which the parameters were determined experimentally, as described previously. A contour plot of the radiation field and the coordinates of the nodes are included, as are the simulated failure times of the nodes.

FIG. 29 shows a plot of the radiation field simulated in conducting the experiments. It consists of a random number of radiation point sources (under 20) of random strength (up to 16 kGy/sec at a space of 1 m), distributed randomly across an area covered by the WSN. Given the random nature of the radiation sources, variance between runs may be observed across different iterations of the simulation, so that the results of one such iteration are used for the experiments.

The node positions and radiation fields were generated and simulated ahead of time using a Python script. The script was programmed to initialize WSN nodes with a threshold failure dose (in kGy) selected using the Weibull distribution from Equation 1 and parameters. Each node was given a failure dose based on the aforementioned distribution, and its dose rate can be calculated from its position relative to the radiation sources. When a node fails, a TCL (Tool Command Language) script may be generated corresponding to its node ID and time of failure, to be included in the network simulation. Similarly, all node positions may output to a text file to be read in to the network simulation, so that the network simulation matches the radiation simulation topologically. This framework of experiments through NS2 with radiation damage distribution is shown in FIG. 30. The NS2 simulation configuration is summarized in Table 4.

TABLE 4

| | |
|---|---|
| TERRAIN | (200 m × 200 m) Square |
| Node Number | 400 |
| Clusters Number | 10 |
| Node Placement | Random & Square Grid |
| Routing Layer | Varies |
| MAC Layer | Sensor |
| Physical Layer | Phy/WirelessPhy |
| Radio Bandwidth | 1 Mbps |
| Radio Range | 20 m |
| CH Change | 20 s |
| Initial Energy | 200 j |

Since statically located sources and nodes were assumed, the failure times may be calculated for all nodes at once through division. However, a more complex radiation model or using an existing well-established code like Monte Carlo N-Particle Transport code (MCNP) may be considered for situations in which the locations of sources and nodes are dynamic.

FIG. 31 shows the number of active nodes during the elapsed time for the configurations of p0.125, p0.25, p0.5 and p1.0. It may be observed that the resilient nodes 112 in the network, the more alive nodes are present as time progresses, and all the nodes are alive during the simulation 100% of the nodes in the network are radiation-resistant nodes 112.

It may be appreciated that while the radiation dose and the related node lifetime may be calculated based on the network configuration shown in FIG. 26, the lifetime calculation for the nodes in the networks shown in FIGS. 27 and 28 may not be changed. The reason may be that the nodes placed to the grids are all resilient nodes 112, and their lifetimes are radiation damage free, although the radiation dose is different at different locations.

FIG. 32 presents the data collection capability of different configurations in the network shown in FIG. 26, in which all the nodes are deployed randomly. Multiple simulations were executed to obtain the average performance data for comparison purposes. In FIG. 32, it can be seen that the data collection capability of the network drops off as time progresses, and that the network decays for the configurations of p0.125, p0.25, and p0.5. The configuration with 100% resilient nodes 112 has a relatively stable data collection capability (i.e. flat decay line indicating no decay), as none of the nodes are damaged by the gamma radiation during the simulation. It may be worthwhile to know the difference of data collection capabilities between these configurations, since the difference of their implementation cost can be large. At the end of the simulation (i.e. 30,000 seconds), it may be observed that p1.0 collects 69.2% more data than p0.5, p0.5 collects 23.8% more data than p0.25, p0.25 collects 30% more data than p0.125.

FIG. 33 presents the data collection capability of different configurations in the network shown in FIGS. 27 and 28, in which the necessary nodes are put on the grids and other nodes are deployed randomly. Again, multiple simulations were run to obtain the average performance data for comparison. At the end of the simulation (i.e. 30,000 seconds), p1.0 collects 71.4% more data than p0.5, p0.5 collects 17.2% more than p0.25, and p0.25 collects 7.35% more than p0.125. As such, the hybrid deployment strategy may be preferable as it offers better performance in terms of data collection capability than the random fashion. The reason is that the proposed LEACH-R requests the radiation-resistant nodes could maintain an essential communication backbone if the conventional nodes are damaged by the gamma radiation, and the hybrid deployment strategy meets this requirement. Moreover, the data indicates that performance drop between p0.5, p0.25 and p0.125 is smaller than full random deployment. In other words, the hybrid method may be a preferential design choice to balance the cost and performance.

If a 17.2% drop in data quality could be accepted, choosing the configuration of 25% nodes as resilient nodes 112 could reduce the cost of building the system 100, as compared to using 50% resilient nodes 112. As mentioned in Table I, the unit price ratio between the conventional and radiation-resistant microcontroller is approximately 1:500. If only radiation-resistant microcontrollers are used on the radiation-resistant node, reducing 100 such nodes (i.e. the difference between p0.5 and p0.25) could drop the total network cost of p0.25 configuration to 1/50,000 of the cost of p0.5 configuration. In practice, a radiation-resistant node may need more radiation-resistant components other than the μC. Thus, the cost-saving could be even greater. Moreover, according to the present design principle, if a significant number of consumable nodes 104 are damaged and the quality of data does not match the established requirements, a second set of consumable nodes 104 could be deployed randomly to the field to compensate the performance loss. However, in the p0.125 configuration the distance between each radiation-resistant nodes is 40 m while the radio range is 20 m in the experiment. In other words, the ratio of resilient nodes 112 in the p0.125 configuration may not be sufficient to maintain a minimum communication backbone in some circumstances. In such circumstances, consumable nodes 104 may be periodically added to the system 100 to help contribute to the WSN to maintain the minimum communication.

Based on the simulation, it may be noted that the data gathering rate has may increase in the time interval between 10,000 and 11,000 seconds in all the simulations. The majority of nodes in the experimental network are deployed randomly. Thus, the node densities in different areas would be inconsistent. In the early stage of the simulations, a few nodes in high density areas are chosen as the CHs, which may result in the more conflicts that delay data transmission. After 11,000 seconds, some nodes in low density area may be chosen as the CHs, in which there may be fewer conflicts, resulting in a higher data gathering rate.

Redundancy of components can be considered an effective strategy for increasing the reliability of complex engineered systems. A common implementation employs triple modular redundant hardware components.

WSNs may be regarded as discrete random distributions of sensor nodes in position space. Summed over time, instances of damage (called single event effects or SEEs) can occur on the spatiotemporal domain of WSNs resulting from interactions with discrete random distributions of particle radiation, such as beta, neutron, and proton radiation. For a WSN in which the sensor nodes may be much smaller than the principal spatial dimensions of the network, the intersection set of the two random distributions (position-variate node regions and particle paths) may be, as a consequence, much smaller than either set. Subject to particle radiation, therefore, individual components of a WSN may have low probability of failure, and failures may occur independently, making the probability of three concurrent failures in a triply-redundant component extraordinarily small.

In contrast, cumulative damage in the spatiotemporal domain of WSNs resulting from interactions with an effectively continuous distribution of gamma radiation may be substantially different. The intersection set of the two distributions (random position-variate node regions and a continuous radiation field) may be, as a consequence, equal in size and identical to the set of node regions. For that reason, individual components of a WSN subject to gamma radiation may have high probability of failure, increasing with dose and time, and failures may not be independent, but instead depend on the shape and time dependence of the radiation field. The simple strategy of redundant components may therefore be ineffective to sustain the reliability of a WSN in a gamma radiation environment. Other strategies, such as the adaptive protocol stack discussed previously may be utilized to help improve system 100 performance.

Although redundancy is an effective strategy for WSNs in space applications, which receive a higher proportion of particle radiation, it may be less practical for nuclear power plant accident events similar to that of Fukushima Daiichi, which tend to be characterized by a higher proportion of gamma radiation. But, despite the different forms of radiation that dominate the two environments, the adaptive LEACH-R protocol stack for nuclear accident events may also help provide a cost effective alternative to the redundant-component strategy in space applications.

Under LEACH-R, resilient nodes 112 may be used to build the backbone of the WSN in the system 100 and may be used to help provide a minimal acceptable resolution of information. Higher spatial resolution may be offered by the consumable nodes 104, which would be gradually destroyed by the radiation. The basic resolution may be regarded as the minimal quality of information requested by the sensing applications. In other words, if an application requests higher minimal resolution, more resilient nodes 112 may be used to form the communication backbone, and vice versa.

For example, a system 100 may be deployed following an accident at a nuclear generating station. At the early stage, emergency workers/responders may simply require a coarse spatial resolution of the radiation to determine the radiation protection equipment required. Therefore, a relatively smaller number of resilient nodes 112 may be deployed, as the minimal acceptable resolution is low. In another example, a system 100 may be used to detect a Radiological Dispersion Device (RDD) in a radiological terrorism incident, in which the spatial resolution may be important for effective incident management and medical response. High spatial resolution measurement of radiation dose to which the population at risk may be exposed may be important. Terrorism incidents may happen in highly populated urban areas. Thus, a much higher spatial resolution may be requested, and more resilient nodes 112 may be deployed into the network to provide the higher minimal resolution.

The invention claimed is:

1. A system for monitoring ionizing radiation in a target area, the system comprising:
    a) a first plurality of consumable nodes deployable within the target area to be exposed to the ionizing radiation, each consumable node being progressively damageable over a monitoring time as a result of exposure to the ionizing radiation;
    b) a base station communicably linked to the consumable nodes and operable to detect an amount of radiation damage sustained by the consumable nodes and to determine a dosage of ionizing radiation received by any one of the consumable nodes based on a pre-determined correlation between the dosage of ionizing radiation and the amount of radiation damage sustained by the consumable node.

2. The system of claim 1, wherein the base station is positionable outside the target area.

3. The system of claim 1, wherein each consumable node has at least one property that undergoes error events as a result of exposure to the ionizing radiation and wherein the base station detects the amount of radiation damage sustained by the consumable nodes by detecting the error events of each consumable node over time while the consumable nodes are exposed to the ionizing radiation, and wherein the base station is operable to determine a dosage of ionizing radiation received by any one of the consumable nodes based on a pre-determined correlation between the dosage of ionizing radiation and the number of detected error events for the one consumable node.

4. The system of claim 3, wherein each consumable node comprises at least one consumable electronics module that is damageable by the ionizing radiation, the property comprises a state stored in a memory module of the electronics module and the error event is an unprogrammed change of the state stored in the memory module.

5. The system of claim 4, wherein the electronics module comprises at least one microcontroller in the form of a semiconductor digital integrated circuit that includes the memory module.

6. The system of claim 1, further comprising a plurality of resilient nodes positionable within the target area amongst the plurality of consumable nodes and communicably linked to the base station, the resilient nodes being configured to remain functional for a longer time than the consumable nodes when exposed to the ionizing radiation.

7. The system of claim 6, wherein when exposed to a first dosage of ionizing radiation the consumable nodes have a lifespan of L after which they are rendered inoperable, and wherein the resilient nodes have a lifespan of at least 2 L.

8. The system of claim 1, wherein the plurality of consumable nodes and resilient nodes are communicably linked in a plurality of clusters, wherein each cluster includes at least one resilient node communicably linked to the base station and at least one consumable node communicably linked to the at least one resilient node and are therefore indirectly linked to the base station via the one of the resilient nodes.

9. The system of claim 8, wherein the plurality of consumable nodes are randomly deployable within the target area and the plurality of resilient nodes are deployed within the target area in a pre-determined pattern.

10. A method of monitoring ionizing radiation within a target area, the method comprising:
    a) distributing a first plurality of consumable nodes within the target area and exposing the consumable nodes to the ionizing radiation, wherein the consumable nodes are damaged by the ionizing radiation over time;
b) determining an amount of radiation damage sustained by at least a portion of the consumable nodes as a result of exposure to the ionizing radiation using a base station;
c) determining a dosage of the ionizing radiation received by the at least a portion of the consumable nodes using the base station based on a pre-determined correlation between ionizing radiation dosage and the amount of radiation damage sustained by the consumable nodes.

11. The method of claim 10, further comprising the step of pre-irradiating the consumable nodes prior to positioning the consumable nodes in the target area.

12. The method of claim 10 further comprising:
a) deploying a plurality of resilient nodes within the target area, the resilient nodes wherein the consumable nodes are damaged by the ionizing radiation over time at a slower rate than the consumable nodes;
b) determining an amount of radiation damage sustained by at least a portion of the resilient nodes as a result of exposure to the ionizing radiation using a base station;
c) determining a dosage of the ionizing radiation received by at least a portion of the resilient nodes using the base station based on a pre-determined correlation between ionizing radiation dosage and the amount of radiation damage sustained by the consumable nodes.

13. The method of claim 12, wherein at least a portion of the resilient nodes provide a minimum spatial resolution of the system, and wherein the presence of the first plurality of consumable nodes provides an operating spatial resolution that is greater than the minimum spatial resolution.

14. The method of claim 12, wherein the plurality of consumable nodes and resilient nodes are communicably linked to form a plurality of clusters, wherein each cluster includes at least one resilient node configured as a cluster head node and communicably linked to the base station and at least one consumable node communicably linked to the cluster head node and therefore indirectly linked to the base station via the cluster head node.

15. The method of claim 10, further comprising deploying a second plurality of consumable nodes into the target area after at least some of the first plurality of consumable nodes have been rendered inoperable due to exposure to the ionizing radiation.

16. A self-organizing wireless sensor network that is deployable for monitoring an environmental condition in a target area, the wireless sensor network comprising
a) a plurality of first nodes;
b) a plurality of second nodes that are different than the first nodes, the second nodes are configured as consumable nodes that are progressively damageable over a monitoring time as a result of exposure to the environmental condition, and the first nodes are configured as resilient nodes that are being progressively damageable over the monitoring time as a result of exposure to the environmental condition at a slower rate than the second nodes; and
c) a base station for receiving data from the plurality of first and second nodes, the base station is operable to detect the amount of environmental damage sustained by the consumable nodes and to determine an attribute of the environmental condition based on a pre-determined correlation between the attribute of the environmental condition and the amount of environmental damage sustained by the consumable node,
wherein the plurality of first nodes and second nodes are communicably linked with each other to form a plurality of clusters, each cluster in the plurality of clusters comprising a mixture of first nodes and second nodes and having a designated cluster head node, and wherein the cluster head node of each cluster is a first node.

17. The wireless sensor network of claim 16, wherein the cluster head nodes are communicably linked to each other to provide a communication backbone in communication with the base station, and wherein each second node is communicably linked to the communication backbone.

18. The wireless sensor network as defined in claim 16, wherein
a) the plurality of first nodes are configured to communicate with the base station using a first communication protocol; and
b) the plurality of second nodes are configured to communicate with the first class sensor nodes using a second communication protocol.

19. The wireless sensor network of claim 16, wherein:
a) the first nodes are configured as radiation-resistant nodes that are being progressively damageable over the monitoring time as a result of exposure to the environmental condition.

* * * * *